US007024154B1

(12) United States Patent
Koepper et al.

(10) Patent No.: US 7,024,154 B1
(45) Date of Patent: Apr. 4, 2006

(54) TRAINING TRACKING SYSTEM AND METHOD OF USE

(75) Inventors: David J. Koepper, Avilla, IN (US); R. Scott Lawson, Ft. Wayne, IN (US); James D. Speakman, Columbia City, IN (US)

(73) Assignee: ITT Manufacturing Enterprises, Inc., Wilmington, DE (US)

( * ) Notice: Subject to any disclaimer, the term of this patent is extended or adjusted under 35 U.S.C. 154(b) by 449 days.

(21) Appl. No.: 10/322,172

(22) Filed: Dec. 18, 2002

(51) Int. Cl.
*G09B 3/00* (2006.01)

(52) U.S. Cl. ............... 434/350; 434/118; 434/362; 707/10

(58) Field of Classification Search ............... 434/118, 434/219, 307 R, 308, 322, 323, 350, 362, 434/379; 702/182; 705/1, 7, 9, 12, 10; 706/50, 706/10, 45; 707/1, 103 Y, 3, 10
See application file for complete search history.

(56) References Cited

U.S. PATENT DOCUMENTS

| | | | | |
|---|---|---|---|---|
| 5,058,008 | A * | 10/1991 | Schumacher | 705/9 |
| 5,121,467 | A * | 6/1992 | Skeirik | 706/10 |
| 5,310,349 | A | 5/1994 | Daniels et al. | |
| 5,372,507 | A | 12/1994 | Goleh | |
| 5,590,057 | A * | 12/1996 | Fletcher et al. | 702/182 |
| 5,644,686 | A * | 7/1997 | Hekmatpour | 706/45 |
| 5,806,056 | A * | 9/1998 | Hekmatpour | 706/50 |
| 6,099,320 | A | 8/2000 | Papadopoulos | |
| 6,157,808 | A | 12/2000 | Hollingsworth | |
| 6,308,042 | B1 | 10/2001 | Marsh et al. | |
| 6,438,353 | B1 | 8/2002 | Casey-Cholakis et al. | |
| 6,524,109 | B1 * | 2/2003 | Lacy et al. | 434/219 |
| 6,589,055 | B1 * | 7/2003 | Osborne et al. | 434/219 |
| 6,616,453 | B1 * | 9/2003 | Kouba et al. | 434/219 |
| 6,658,427 | B1 * | 12/2003 | Kogut-O'Connell et al. | 707/103 Y |
| 6,679,703 | B1 * | 1/2004 | Alling | 434/219 |
| 6,764,311 | B1 * | 7/2004 | Kawamura | 434/379 |
| 6,944,616 | B1 * | 9/2005 | Ferguson et al. | 707/10 |
| 2002/0049750 | A1 * | 4/2002 | Venkatram | 707/3 |
| 2002/0077884 | A1 * | 6/2002 | Sketch | 705/12 |
| 2002/0102525 | A1 * | 8/2002 | Coppolino | 434/350 |
| 2002/0173973 | A1 * | 11/2002 | Cirinna et al. | 705/1 |
| 2002/0198748 | A1 * | 12/2002 | Eden et al. | 705/7 |
| 2003/0009373 | A1 * | 1/2003 | Ensing et al. | 705/10 |
| 2003/0046265 | A1 * | 3/2003 | Orton et al. | 707/1 |
| 2003/0078798 | A1 * | 4/2003 | Zaks et al. | 705/1 |
| 2003/0082508 | A1 * | 5/2003 | Barney | 434/308 |
| 2003/0099924 | A1 * | 5/2003 | Tsuboi et al. | 434/350 |
| 2004/0048233 | A1 * | 3/2004 | Matthews et al. | 434/350 |
| 2004/0219493 | A1 * | 11/2004 | Phillips | 434/118 |

* cited by examiner

*Primary Examiner*—Joe H. Cheng
(74) *Attorney, Agent, or Firm*—RatnerPrestia

(57) ABSTRACT

A method of processing training data is provided. The method includes accessing training data stored in at least one of a plurality of training databases, the training data being related to at least one of a plurality of employees. The method also includes providing an on-line training course for use by at least one of the plurality of employees, the on-line training course being distinct from the plurality of training databases. Additionally, the method includes formatting the training data included in the at least one of the plurality of databases such that the training data can be processed by a master database. The method also includes importing the formatted training data into the master database. Further, the method includes updating the master database to include training information related to the on-line training course upon the successful completion of the on-line training course by one of the plurality of employees is provided.

10 Claims, 34 Drawing Sheets

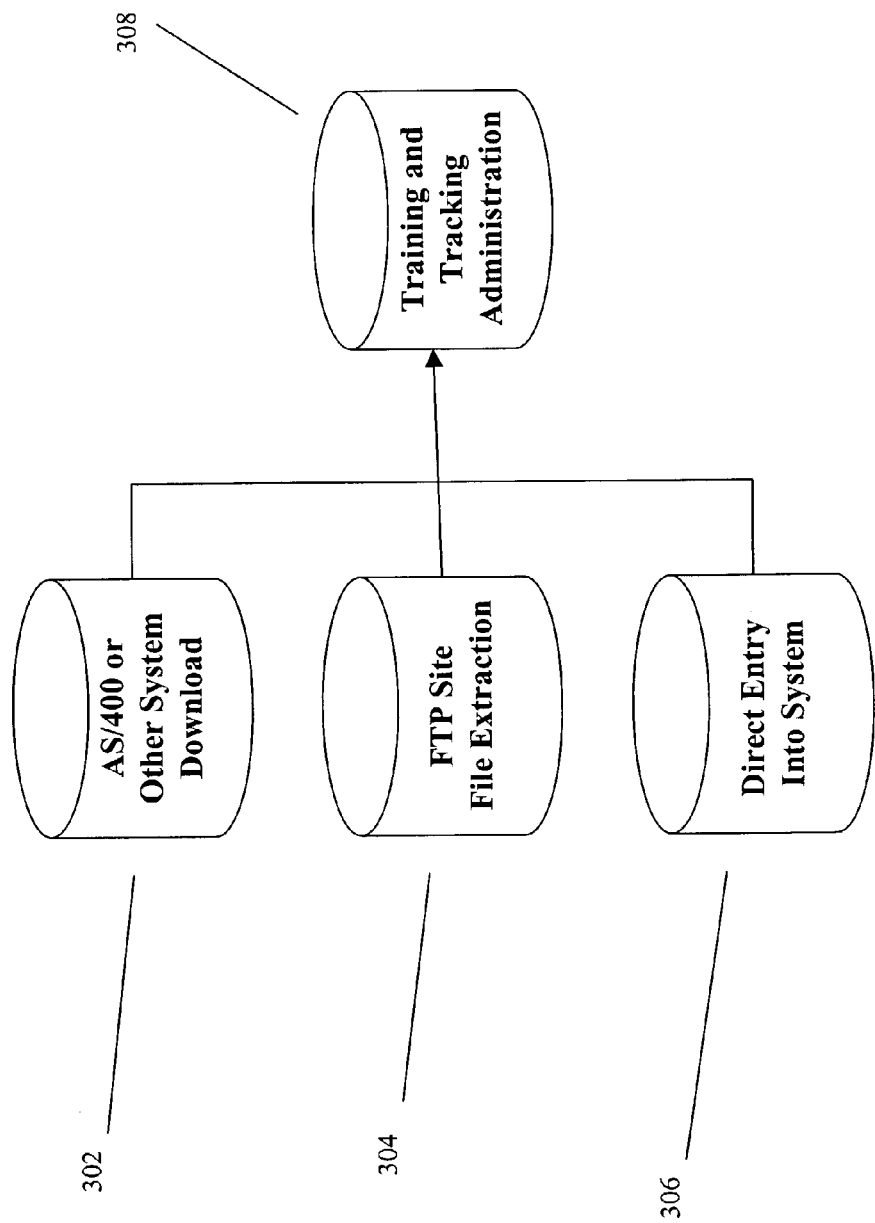

Figure 3C tblDigitalTrainerLog : Table

| Field Name | Data Type | Description |
|---|---|---|
| tnlID | AutoNumber | |
| Field1 | Text | |
| Field2 | Text | |
| Field3 | Text | |
| Field4 | Text | |
| Field5 | Text | |
| Field6 | Text | |
| Field7 | Text | |
| Field8 | Text | |
| FileName | Text | |
| StoreGuid | Text | |
| Title | Text | |
| Date | Date/Time | |
| Time | Date/Time | |
| StartTimeCode | Number | |
| ElapsedTime | Number | |
| TimeLimit | Number | |
| TotalQuestions | Number | |
| AnsweredCorrectly | Number | |
| PointsEarned | Number | |
| QuestionsSeen | Number | |
| PercentCorrect | Number | |
| Category | Text | |

Field Properties

General | Lookup

Field Size: Long Integer
New Values: Increment
Format:
Caption:
Indexed: No

TRAINING TRACKING SYSTEM AND METHOD OF USE

FIELD OF THE INVENTION

The present invention relates, in general, to a training tracking system and a method of using the same, and more specifically, to a training tracking system that provides for the retrieval of training data in a number of different formats.

BACKGROUND OF THE INVENTION

Various employee training systems are known. Conventional training is conducted in a classroom style setting. Upon completion of such a training course, a certificate may be issued to the employee, and a data entry person (or possibly a human resources employee) manually enters a record of the training into a computer system. Such a training administration system suffers from a number of deficiencies. For example, when the computer system is upgraded the training records may need to be entered into a new training spreadsheet or the like. Further, tracking whether an employee has completed required training may be difficult in such a system.

Other training systems include software programs that accept or retrieve training data in a given format. However, training data is often compiled over extended periods of time, and is stored in a number of different formats. Conventional software programs are typically limited in that automatic recording of training data is restricted to the software vendors programs. As such, these types of software products do not allow for multiple integration of data inputs.

Further, conventional training administration systems typically do not support training courses that require various distinct duration frequencies. If an employee can access a training course on the web, conventional web based training programs do not allow the employee to obtain an employee specific training history and training requirements.

Further still, access to conventional training administration systems is very limited in scope. For example, a training program may either allow access to the training tracking system to make entries or edits, but may not allow departmental access to the training tracking system.

As such, a more flexible training tracking system and method of use would be desirable.

SUMMARY OF THE INVENTION

In an exemplary embodiment of the present invention, a method of processing training data is provided. The method includes accessing training data stored in at least one of a plurality of training databases, the training data being related to at least one of a plurality of employees. The method also includes providing an on-line training course for use by at least one of the plurality of employees, the on-line training course being distinct from the plurality of training databases. Additionally, the method includes formatting the training data included in the at least one of the plurality of databases such that the training data can be processed by a master database. The method also includes importing the formatted training data into the master database. Further, the method includes updating the master database to include training information related to the on-line training course upon the successful completion of the on-line training course by one of the plurality of employees is provided.

BRIEF DESCRIPTION OF THE DRAWINGS

The invention is best understood from the following detailed description when read in connection with the accompanying drawings. This emphasizes that according to common practice, the various features of the drawings are not drawn to scale. On the contrary, the dimensions of the various features are arbitrarily expanded or reduced for clarity. Included in the drawings are the following features:

FIG. 3A is a block diagram illustrating features of a training system in accordance with an exemplary embodiment of the present invention;

FIG. 3C is a table for use with a training system in accordance with an exemplary embodiment of the present invention;

FIG. 5B is an employee training screen in accordance with an exemplary embodiment of the present invention;

FIG. 7D is a training course summary screen for use with a training system in accordance with an exemplary embodiment of the present invention;

FIG. 8B is another department report screen for use with a training system in accordance with an exemplary embodiment of the present invention;

FIG. 8C is an employee specific report screen for use with a training system in accordance with an exemplary embodiment of the present invention;

FIG. 8D is another employee specific report screen for use with a training system in accordance with an exemplary embodiment of the present invention;

DETAILED DESCRIPTION OF THE INVENTION

Figure 1:
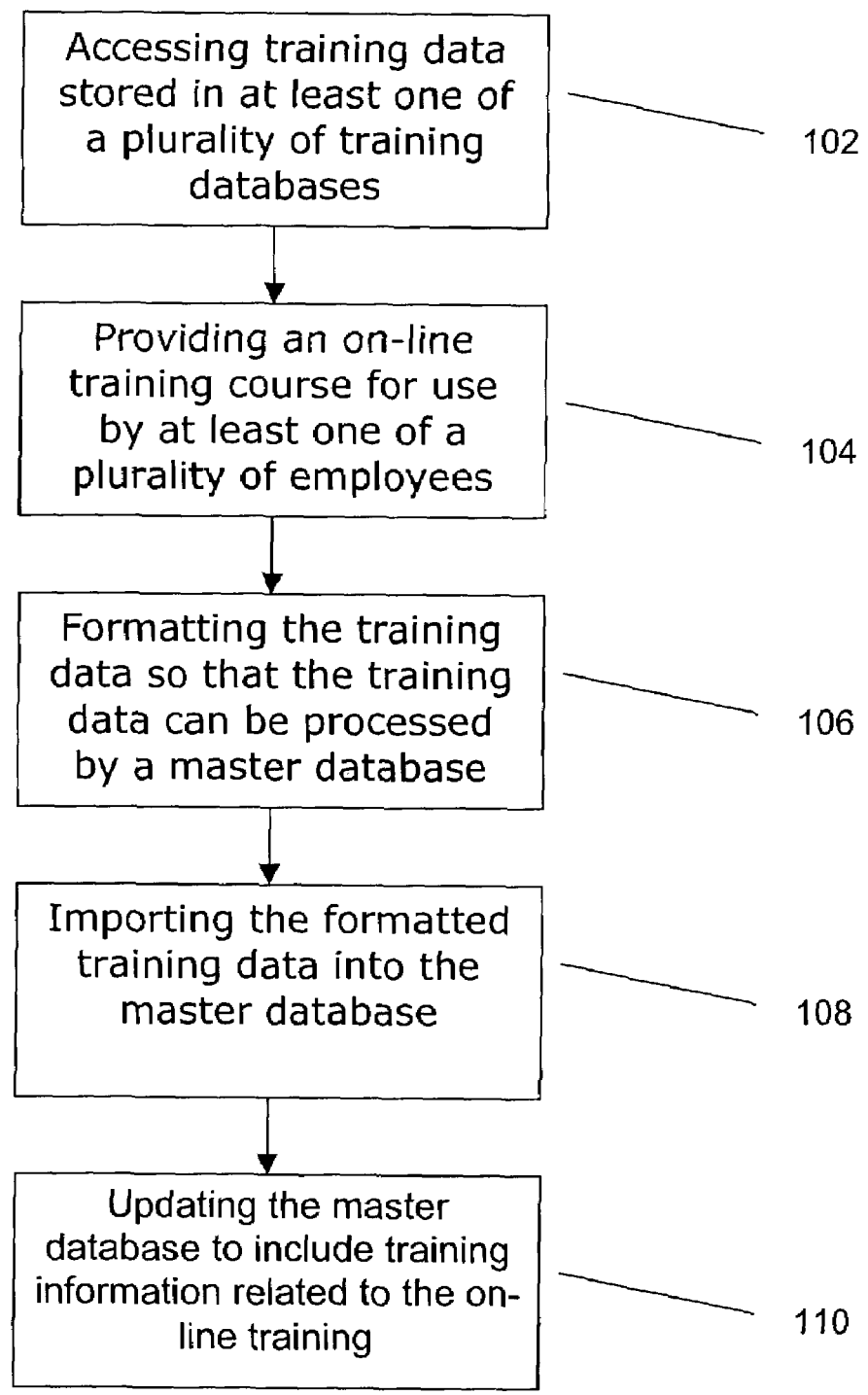
FIG. 1 is a flow diagram illustrating a method of processing training data in accordance with an exemplary embodiment of the present invention.

In an exemplary embodiment of the present invention, a training system (and a method of using the same) is provided that allows (1) existing employee training records that are stored in a number of databases to be retrieved into a master database, (2) on-line courses to be completed, and their associated training records to be retrieved into the master database, (3) employee training records to be manually entered into the master database, and (4) flexible reporting capabilities.

In an exemplary embodiment, the present invention provides for automatic data recording of training data that can be set in any editable program, and provides for transfer of the training data to a master database. Training courses may be assigned in any of a number of customizable durations, for example, by any desired number of days, or to be due in a particular month of the year.

In an exemplary embodiment, the present invention provides employee access to a employee specific screen (e.g., an employee specific active server webpage) that indicates courses assigned to the employee and the date the course was last taken, the next date that the course is required, and an indication of an overdue status for overdue courses. Further, the present invention provides for the employee to immediately launch a training course from this employee specific screen if this particular training course is available on the web as an on-line course, or any other format that may be hyperlinked to the employee specific screen. Further still, the employee specific screen may include a complete training history for the employee that includes training records from (1) an on-line automated training tracking system, (2) a manual entry web-based system, and (3) imported files from other training data storage systems.

The training administration system can be set up so that any person with a valid username and password can access the system, or a portion of the system. For example, a person with a valid username and password can be given restricted access to those departments that have been assigned to that person, or the person can be given complete access to all departments within the training system.

In an exemplary embodiment, the present invention includes three primary components: the master database (main database), webpages for training coordinators, and webpages for employees. The master database, for example, is an SQL database that (1) receives automatic training data (including scoring of an exam) from the on-line programs, (2) uploads training data from the AS/400 training tracking system, and (3) receives manual inputs into the database interface.

Training courses that are created in the database can be assigned to an entire department(s), specific employees, or defined groups. The training courses can have due dates based on a day frequency such 365 days for annual training, or by an assigned month such as January each year. Department wide training can be excluded from individual employees within the department. Employee data is imported into the system such that the system can display training assignment and status reporting for all current employees. Training Coordinators (TC) may be assigned as users of the training system. Each TC can be assigned to coordinate training for individual departments in an organization, or to all employees and departments in the organization. E-mails providing notification of overdue training and/or a percent complete of department wide training can be sent to vice-presidents, directors, TCs, and individual employees.

TCs can access the training system using a web-interface. Each coordinator can assign, exclude, or delete training for a given employee, department, or group. Further, training records can be manually entered into individual employee files by a TC. Reports are available to the TC to provide the training status for all assigned training on an individual employee, department, or group basis. For example, the reports may be in html format, but may also be exported to a .csv (comma separated variable) file that may be accessed in a spreadsheet program such as Microsoft Excel.

Individual employees can access the training system via the web, for example, using a company specified ID number. As such, a single employee specific webpage may provide a listing of all assigned courses, the date each of the assigned courses was last taken, the next due date for each of the courses, and an overdue indication for an overdue course. Credit for taking a course can come from any of a number of data sources. For example, an employee can launch a course by clicking on the course title at the employee specific webpage and completing the course on-line (if it is a hyperlinked course). Hyperlinked courses may be on-line programs, web programs, or any other file format that can be hyperlinked. The employee specific webpage may also provide a detailed listing of all training that the employee has completed, regardless of the source of the training data.

In an exemplary embodiment of the present invention, the master database has a number of purposes, for example: (a) administration and importation of on-line training records; (b) importation of AS/400 (or other database stored) training records; (c) providing training coordinator access and department assignments; (d) allowing for the direct input of training records into the master database; (e) providing various training reports.

FIG. 1 is a flow diagram illustrating a method of processing training data. At step 102, training data that stored in at least one of a plurality of training databases is accessed. The training data stored in the at least one of a plurality of databases is related to at least one of a plurality of employees. At step 104, an on-line training course is provided for use by at least one of the plurality of employees. The on-line training course is distinct from the training data in the plurality of training databases. At step 106, the training data included in the at least one of the plurality of databases is formatted such that the training data can be processed by a master database. At step 108, the formatted training data is imported into the master database. At step 110, the master database is updated to include training information related to the on-line training course upon the successful completion of the on-line training course by one of the plurality of employees.

Figure 2:
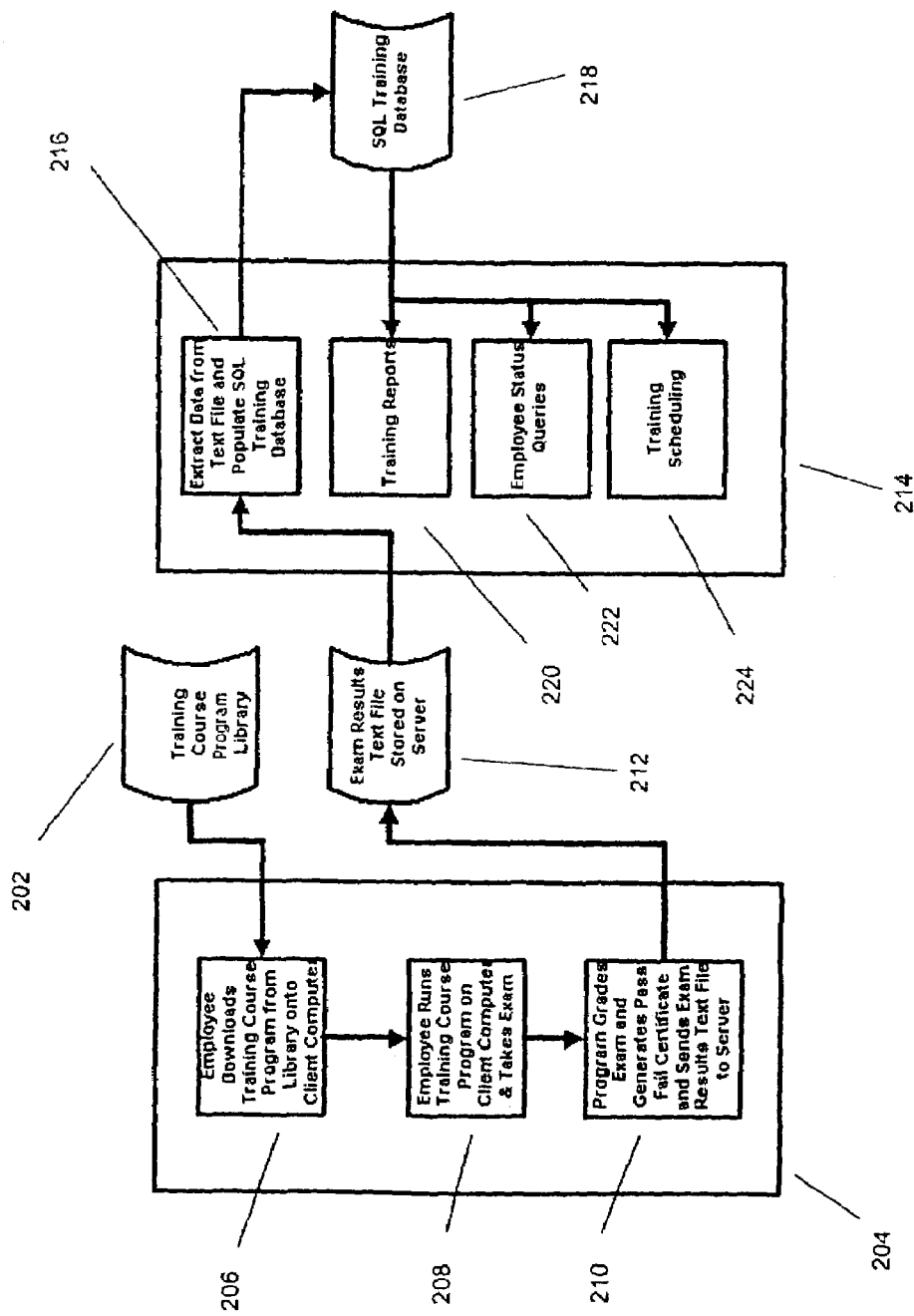
FIG. 2 is a flow diagram of a training system in accordance with an exemplary embodiment of the present invention.

FIG. 2 illustrates an exemplary process by which an employee may complete a training course, and a training database can be updated based on the employee's course completion. Course program library 202 is a library of courses to which the subject employee has access. For example, all employees in a given organization may have access to all of the courses in course program library 202. Alternatively, course program library 202 may be employee or group specific.

Module 204 provides a process by which the subject employee can access a course, complete the associated course exam, and generate a pass/fail certificate. For example, Module 204 may be a computer program written to accomplish the course completion process. At step 206, the subject employee downloads a training course program from course program library 202. For example, the training course program downloaded may be a course that the employee is required to complete. At step 208, the subject employee runs the downloaded training course program and takes the associated exam. At step 210, module 204 grades the exam and generates a pass or fail certificate based on the employee's performance on the exam and the raw score required to pass the exam. Module 204 then sends the exam results (i.e., the pass or fail certificate) in a text file format to server 212. Server 212 stores the exam results in a text file format for a given period of time. For example, all of the exam results stored on server 212 may be extracted on a daily basis as a batch of text files. Alternatively, the exam results stored on server 212 may be extracted as soon as the exam results are received by server 212. As such, the exam results stored on server 212 may be extracted at any desired time interval.

Module 214 extracts the exam results from server 212 at step 216. Additionally, at step 216, SQL training database 218 is populated using the exam results. Training data in SQL training database 218, including the exam results retrieved at step 216, may be used to satisfy a variety of functions. For example, at step 220, the data is used to produce training reports. Alternatively, at step 222, the training data may be used to satisfy employee status queries. Further still, at step 224, the training data may be used to produce training schedules.

In an exemplary embodiment of the present invention, a master database (an SQL database) may retrieve training data in a variety of formats, and allow access to this training data from the master database in a single format. FIG. 3A illustrates a master database (training and tracking administration database 308) that receives training data in three formats. For example, training data may be downloaded from previously existing training databases to database 308. In one embodiment, this previously existing training data is an AS/400 system of training database(s). Training data may also be extracted from a FTP site 304 to database 308. For example, FTP site 304 may be a server that receives on-line training course exam results in a text file format. Further still, database 308 may be directly populated with training data through direct entry system 306. For example, if a traditional (not on-line) training course is given, the results of the training course may be manually inserted into database 308.

As provided above, one method of populating a master training database is to download training data from an existing training database(s). In an exemplary embodiment of the present invention, training data is transferred from an AS/400 training tracking system (previously existing training database) using a Rally File Transfer. RALLY! supports the AS/400 file transfer, which provides for the transfer of files between the AS/400 and a computer. With the AS/400 file transfer, a file transfer configuration that has been created to a file can be reused, thereby saving time and ensuring consistency in the event that repeatedly run file transfers require the same transfer setting. SQL (Structured Query Language) commands may be used to construct queries that specify the files, fields, and records to be received from the AS/400. Such a configuration file may be called by the master database as needed, and the configured transfer session allows for the creation of a file extract in pre-defined formats.

The master database begins a transfer session, thereby creating a comma delimited text file that is then automatically imported into the master database. For example, the format of the comma delimited text file may be: Company, Social Security Number, Course, Course Title, Date, Course Category. The comma delimited text file, which may be generated by the AS/400 or another system is then imported into the master database as a separate table. As such, this text file results in a complete data dump from a previously existing training database system (e.g., AS/400) to the master database. The table content may then be deleted to allow for new content to be transferred to the master database. An example of such a table is shown in FIG. 3B.

Figure 3B:
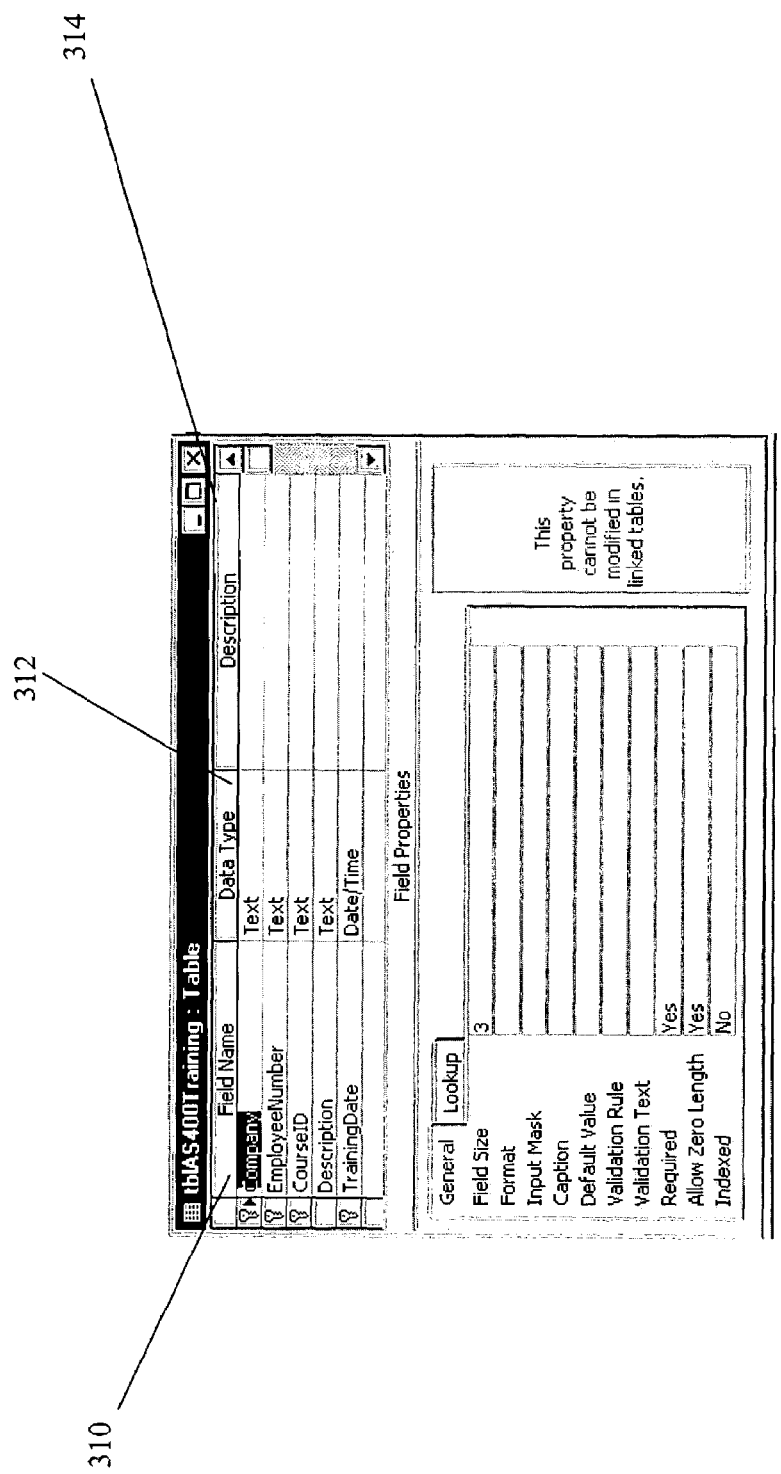
FIG. 3B is a table for use with a training system in accordance with is an exemplary embodiment of the present invention.

As shown in FIG. 3B, the table includes a field name column 310, a data type column 312, and a description column 314.

As discussed above, another mechanism for populating the master database is to extract training data from a FTP site file. In an exemplary embodiment of the present invention, on-line training programs create a comma delimited text file upon the completion of the on-line training. For example, this text file is sent to a FTP (file transfer protocol) site. This mechanism obtains the training files differently than the previously described AS/400 system in that this system is designed to extract multiple text files with unique names from an FTP folder, and to import each file individually into the master database. Each of the files is appended to the master database table as a new record. For example, any file designated with a unique number in this folder can be uploaded to the master database; that is, it is not dependent upon another program to develop a text file. In an exemplary embodiment of the present invention, the imported text file format is as follows: "Field 1," "Field 2," "Field 3," "Field 4," "Field 5," "Field 6," "Field 7," "Field 8," "FileName," "StoreGuid," "Title," "Date," "Time," "StartTimeCode," "ElapsedTime," "TimeLimit," "TotalQuestions," "AnsweredCorrectly," "PointsEarned," "QuestionsSeen," "PercentCorrect," "Category." Such a text file format is illustrated in the table shown in FIG. 3C, where the data is tabulated in field name column 316, data type column 318, and description column 320.

Figure 3D:
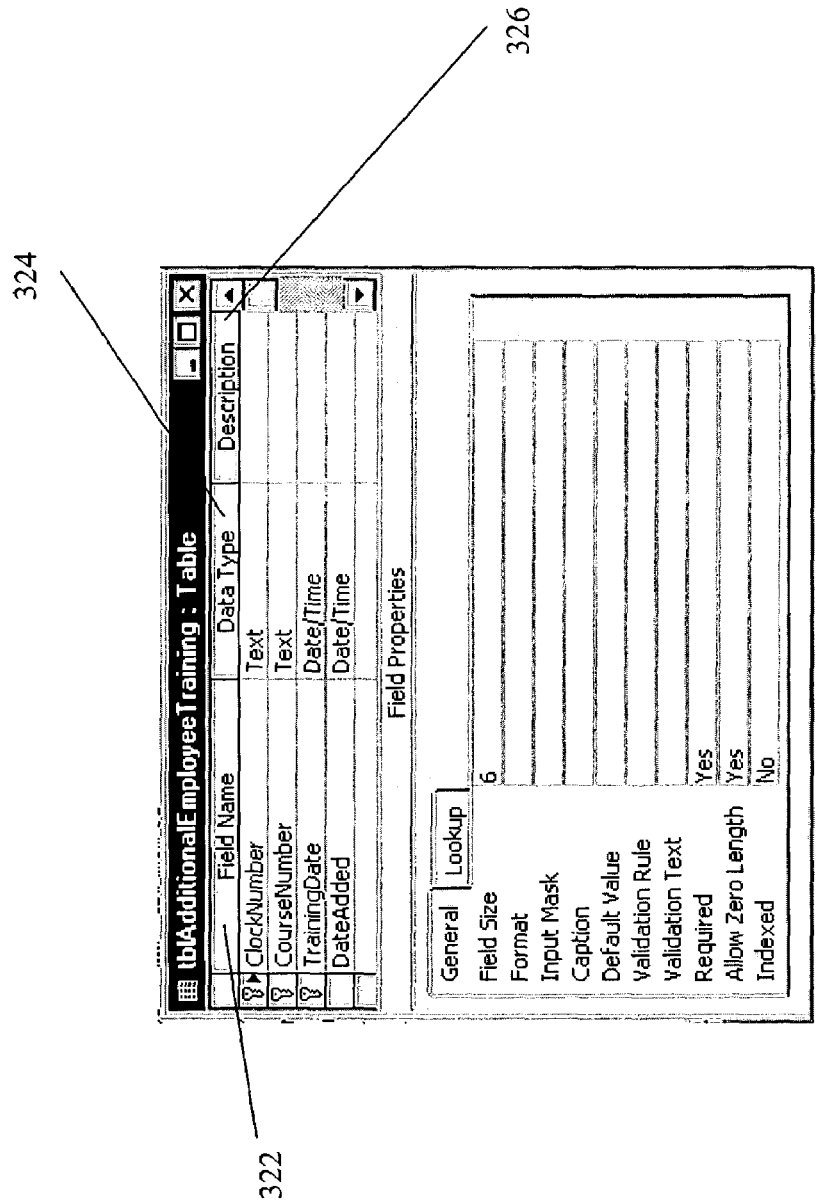
FIG. 3D is a table for use with a training system in accordance with an exemplary embodiment of the present invention.

As provided above, yet another mechanism for populating the master training database is direct data entry. Such a mechanism allows for the manual input of individual training records, for example, using a web data entry form. The web page used for the data entry may be an active server page (asp) that feeds the information to the SQL table such as the exemplary form illustrated in FIG. 3D. As before, the table organizes the training data in field name column 322, data type column 324, and description column 326.

Figure 4:
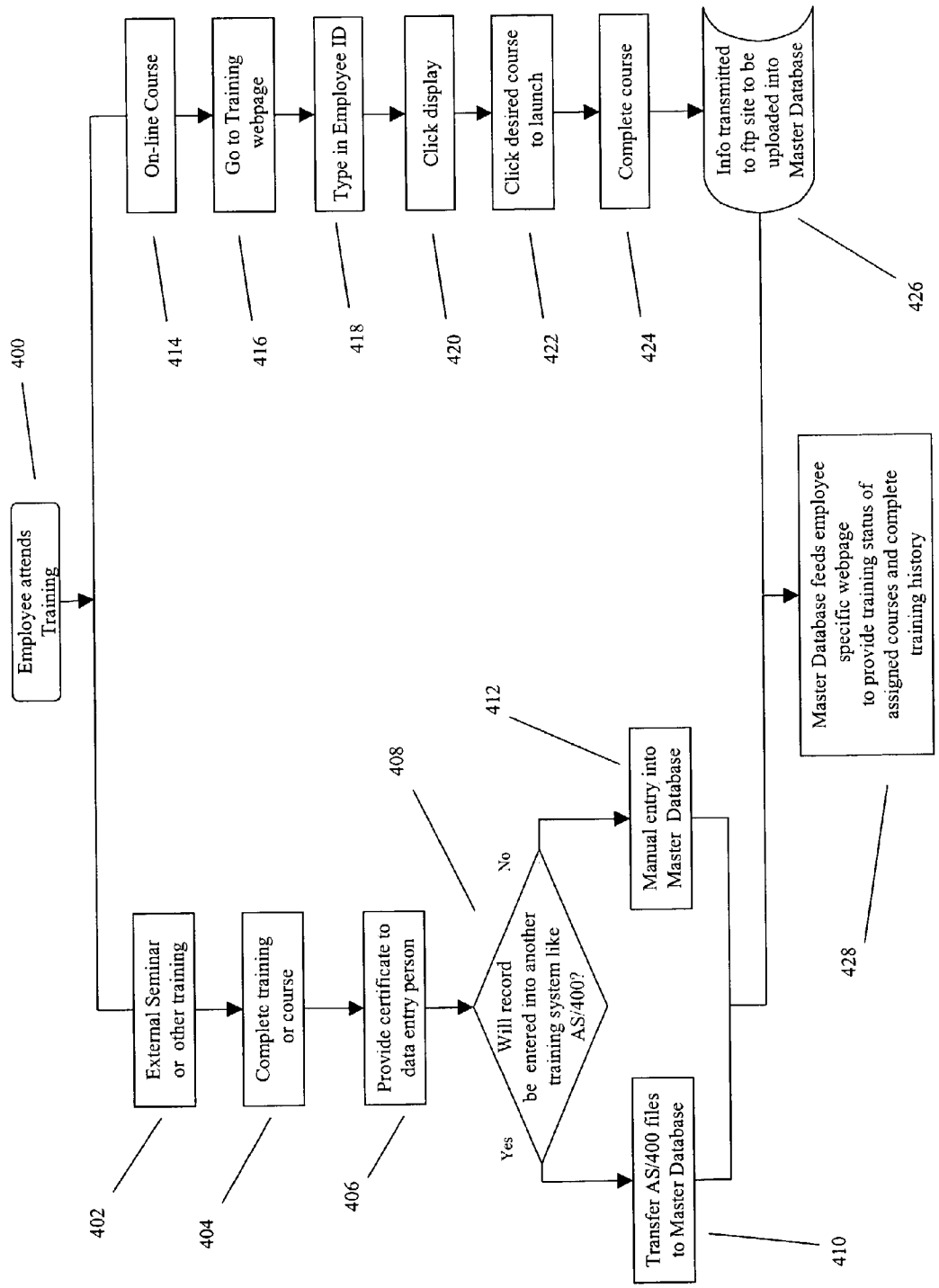
FIG. 4 is a flow chart illustrating an employee training process in accordance with an exemplary embodiment of the present invention.

FIG. 4 illustrates an exemplary process by which an employee obtains training, and the master training database is updated based on the completion of the training. At step 400, an employee attends training. For example, the employee may attend an external training seminar or a live training course, at step 402. Alternatively, the employee may attend an on-line course at step 414.

If the training is an external seminar or live training course, the training is completed at step 404. Following the completion of the training, a certificate is provided to a training data entry person at step 406. At step 408, a decision is made as to whether this training data will be entered into another training system such as the AS/400 system. If the data is entered into another training database system such as the AS/400, the AS/400 files are transferred to the master database at step 410. Alternatively, the training record may be manually entered into the master database at step 412.

If the training is conducted on-line, this process may be commenced by logging onto a training web page at step 416. An employee I.D. number is entered at step 418. A display button is "clicked" at step 420, and a desired course is launched at step 422. The on-line course is completed at step 424, and the training data is transmitted to the FTP site and subsequently uploaded into the master database at step 426.

Regardless of how the master database is populated, at step 428 the master database updates the employee's specific training web page, thereby providing the employee with the status of assigned training courses and a complete training history.

Figure 5A:
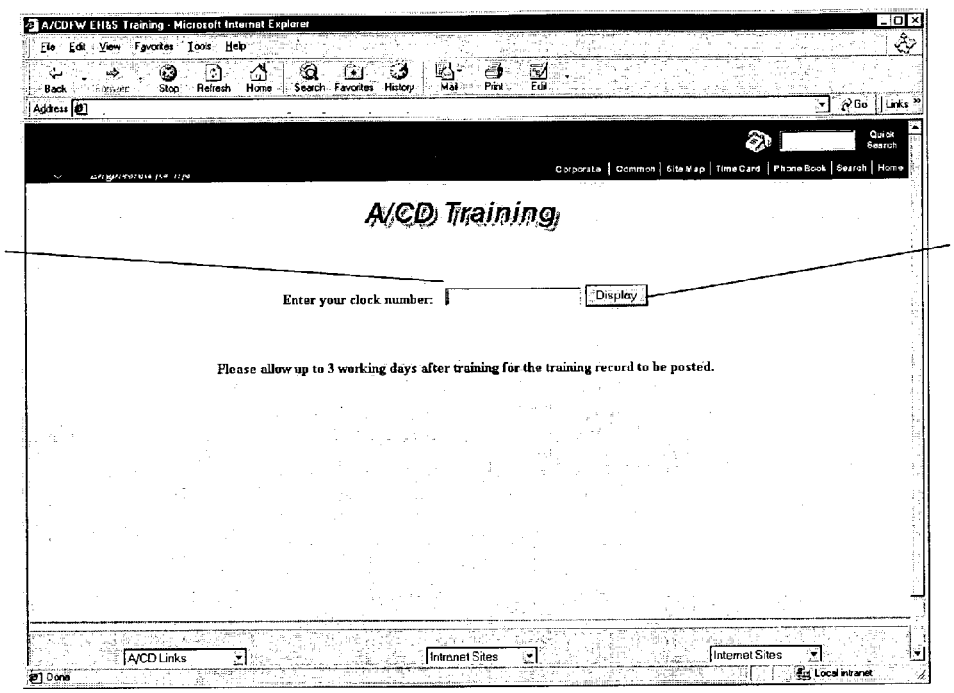
FIG. 5A is a security screen for use with a training system in accordance with an exemplary embodiment of the present invention.
Figure 5B:
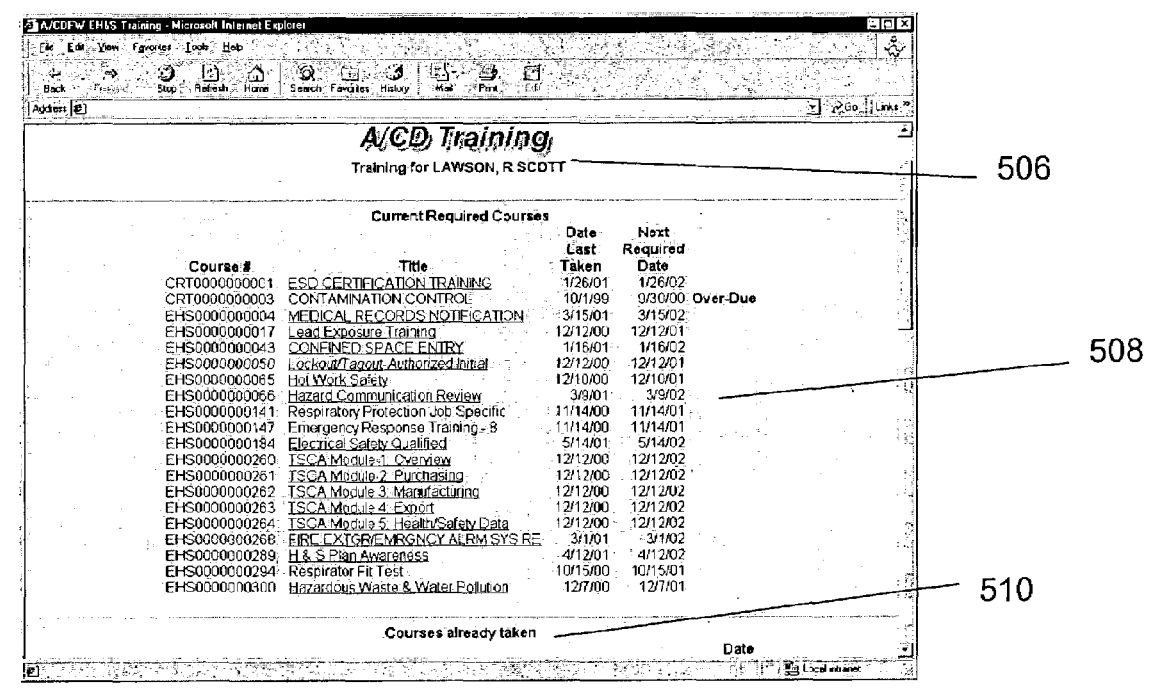

In the event that training is to be completed by an employee on-line, the employee must first log-on to the main training website. For example, the employee may log-on to the training website using a link on a corporate homepage. FIG. 5A illustrates an initial screen whereby the employee may gain access to a training course. The screen includes an entry block 502 for the employee's clock number (identification number), and a display button 504 for proceeding after the entry of the clock number. Hitting display button 504 then takes the employee to the screen illustrated in FIG. 5B. This screen includes the employee's name 506, a current required course list 508, and a courses already taken list 510 (only partially shown in FIG. 5B). From this screen, the employee may select a link to a course included in the current required course list 508, and proceed to completing the course.

Figure 6:
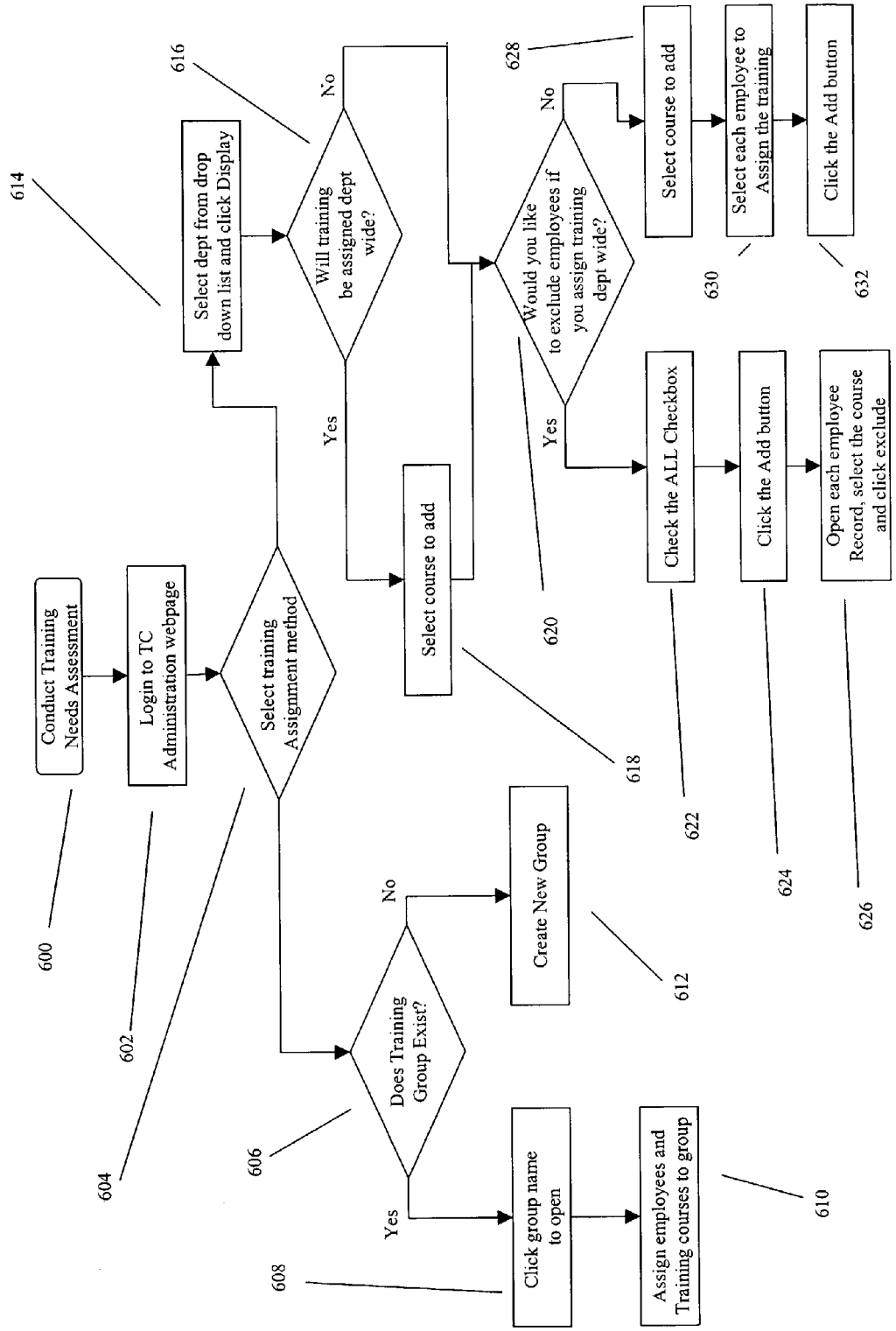
FIG. 6 is a flow chart illustrating a training coordination process in accordance with an exemplary embodiment of the present invention.

In many training programs, one or more training coordinators are appointed for coordinating the training program. FIG. 6 illustrates an exemplary process of coordinating the training program. At step 600, an assessment is conducted as to employee training requirements. At step 602, the coordinator logs-in to the training coordinator administration web page. At step 604, the coordinator selects a desired method of assigning training. For example, the coordinator may select to assign training as a training group, or to a department and employee.

Should the coordinator select to assign training to a training group, the process proceeds to decision step 606, where the coordinator decides if the appropriate training group exists or not. If the training group exists, the coordinator clicks on the appropriate training group name at step 608 and then assigns the employees and training courses to the training group at step 610. If the appropriate training group does not exist, a new training group is created at step 612.

If the coordinator decides to assign training on a departmental or employee basis, the coordinator selects the appropriate department, for example, from a drop-down list, at step 614. The coordinator then proceeds to decision step 616, at which the coordinator decides whether the training will be assigned department-wide or not. If the training is to be assigned department-wide, the coordinator selects a course at step 618. The coordinator then proceeds to decision step 620, where the coordinator must decide whether to exclude certain employees if the training is being assigned department-wide. If certain employees are being excluded from the department-wide training, the coordinator selects the "all" check box at step 622, clicks the "add" button at step 624, and then opens the relevant employee records, selects the course and clicks "exclude" at step 626. If no employees are being excluded, the coordinator selects the course to add to the training program at step 628, selects each employee to assign the training at step 630, and clicks the "add" button at step 632.

Figure 7A:
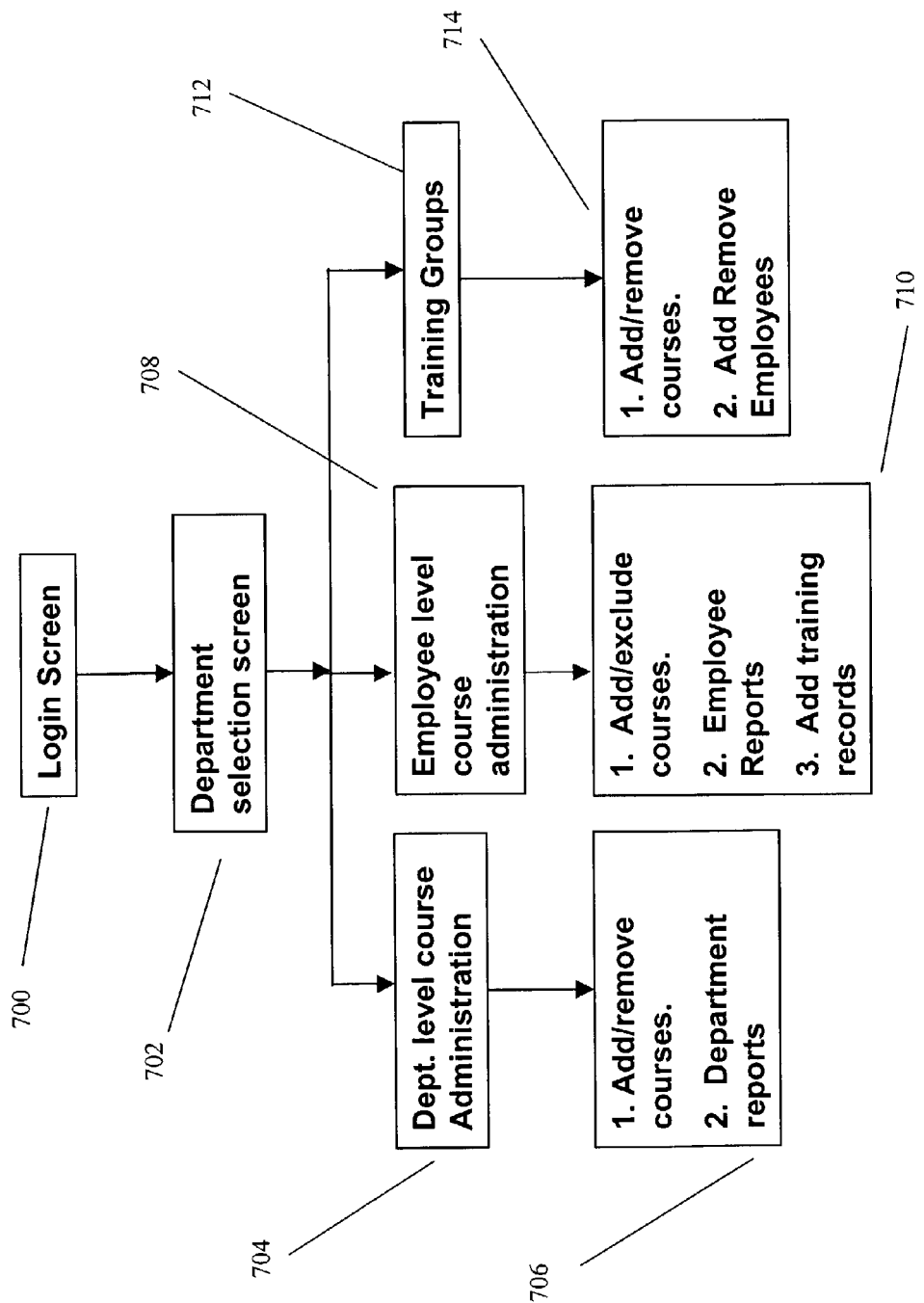
FIG. 7A is a block diagram illustrating aspects of a training system in accordance with an exemplary embodiment of the present invention.

FIG. 7A illustrates an exemplary training coordinator web page layout. The web page layout commences at log-in screen 700, and proceeds to department selection screen 702. The training coordinator may then select how the training program changes will be administered, that is, whether by department, employee, or by training group. If the coordinator selects the department level course administration 704, the coordinator may then proceed to add courses, remove courses, or produce training reports, by department, at step 706. If the coordinator selects the employee level course administration 708, the coordinator may then proceed to add courses, exclude courses, produce employee reports, and add training records, by employee, at step 710. If the coordinator selects the training group level course administration 712, the coordinator may then proceed to add courses, remove courses, add employees, and remove employees, by training group, at step 714.

Figure 7B:
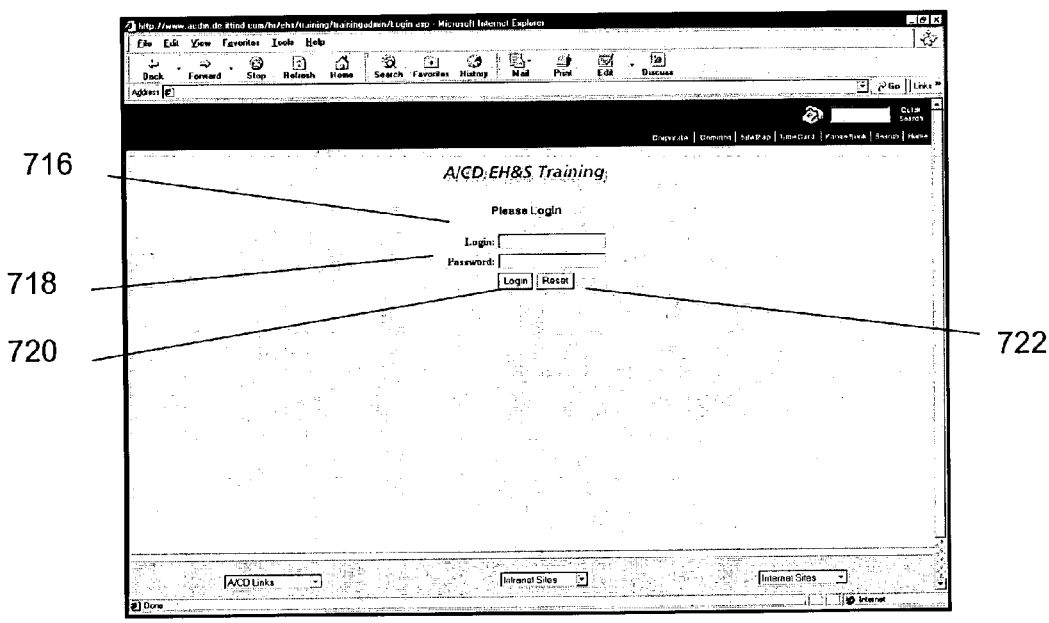
FIG. 7B is a security screen for use with a training system in accordance with an exemplary embodiment of the present invention.
Figure 7C:
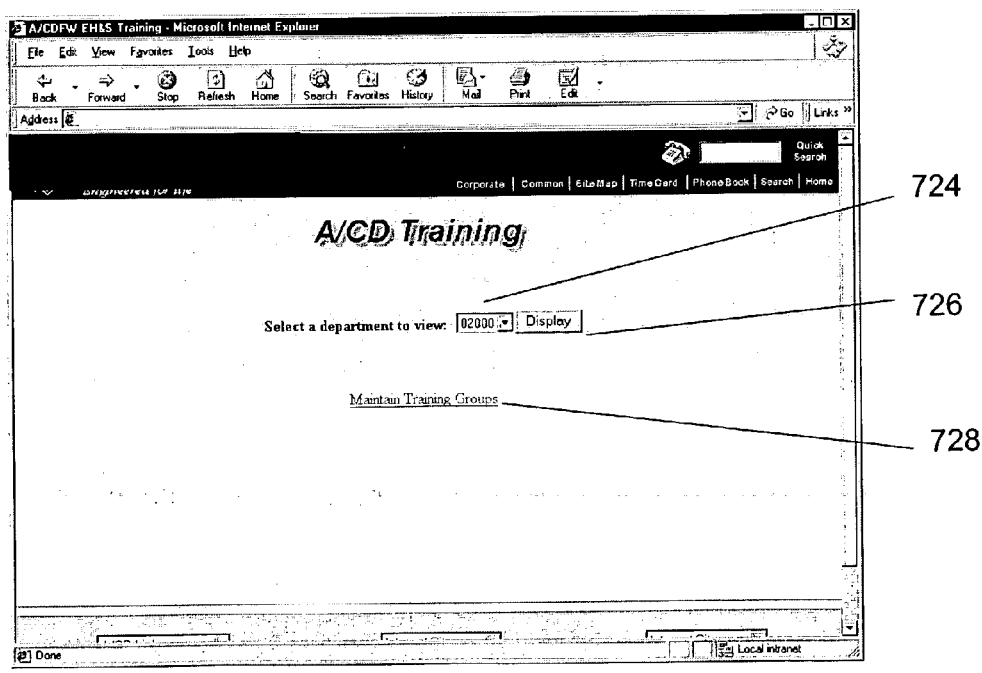
FIG. 7C is a department selection screen for use with a training system in accordance with an exemplary embodiment of the present invention.

FIG. 7B is an exemplary training coordinator log-in screen, and includes log-in box 716, password box 718, log-in button 720, and re-set button 722. After completing the log-in screen, the training coordinator proceeds to a screen to select a training department. FIG. 7C illustrates such a screen, including department selection box 724, display button 726, and a link to existing training groups 728.

Figure 7D:
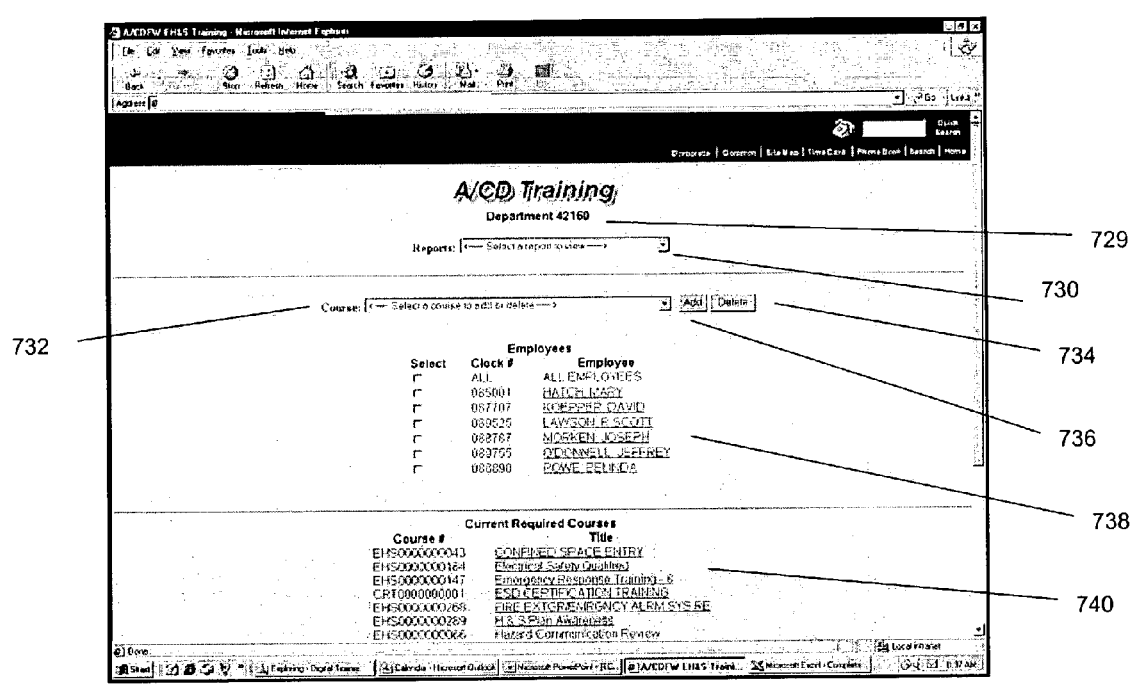

FIG. 7D illustrates an exemplary screen for changing the training requirements of a department. This screen identifies the department with identifier 729. The coordinator may view any department-based reports using drop down box 730. In order to add or delete a course, the coordinator may select the course using course selection box 732. The coordinator may then select the "all" check box at employee list 738 in order to select the entire department. The coordinator may then add or remove the course from the training requirements of the department using add button 736 or delete button 734. In an exemplary embodiment of the present invention, a screen or pop-up window will appear indicating that a given course has been added or removed from department's training requirements. FIG. 7D also illustrates current required course list 740.

Figure 7E:
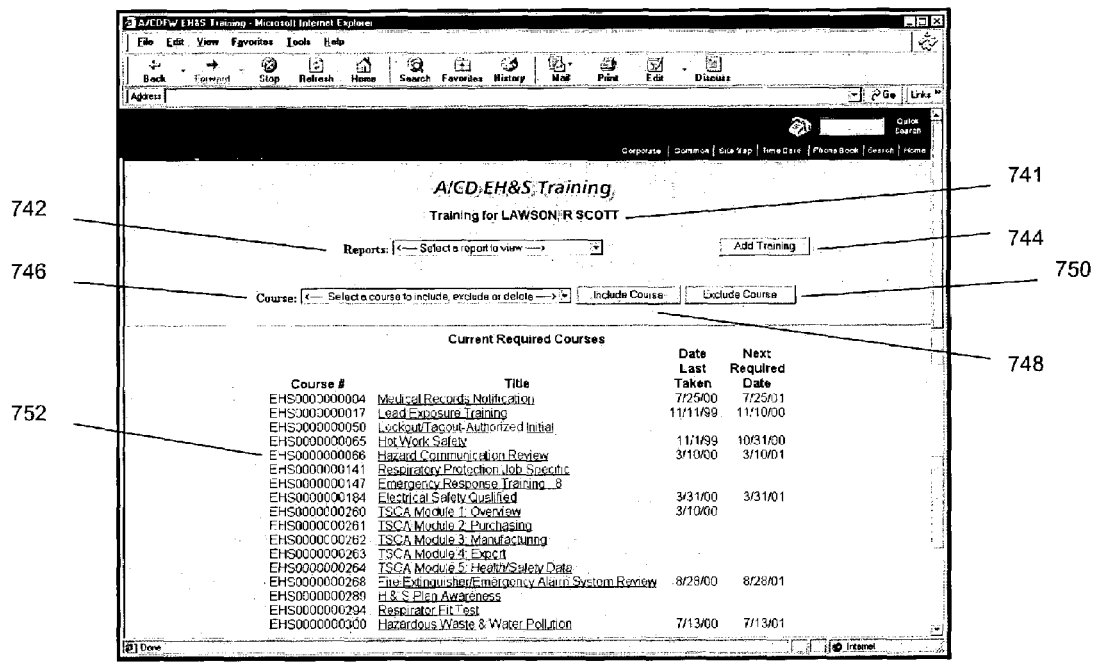
FIG. 7E is an employee specific training screen for use with a training system in accordance with an exemplary embodiment of the present invention.

FIG. 7E illustrates a screen providing a first method of modifying an individual employee's training requirements. This screen includes employee identifier 741, and report selection box 742. In order to modify the training requirements of the employee, the coordinator may select a course from course selection box 746, and then either add or delete the course from the employee's training requirements by clicking include course button 748 or exclude course button 750. The coordinator can input training completed by the employee, but that did not transfer to the training system, using add training button 744. Use of add training button 744 may require that the employee provide a passing certificate to verify that the course has been successfully completed. This screen also includes current required course list 752.

Figure 7F:
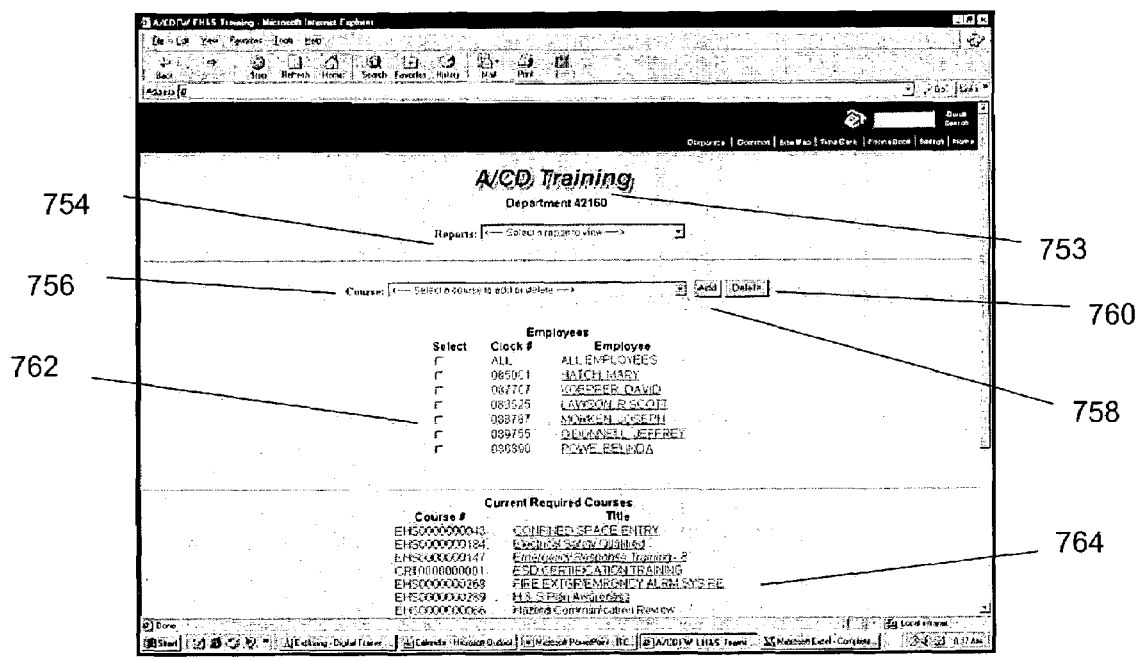
FIG. 7F is a department specific training screen for use with a training system in accordance with an exemplary embodiment of the present invention.

FIG. 7F illustrates a screen that provides another method of modifying an individual employee's training requirements. This screen is very similar to the screen illustrated in FIG. 7D, and includes department identifier 753. The coordinator may view any reports using drop down box 754. In order to add or delete a course, the coordinator may select the course using course selection box 756. The coordinator may then select the specific employee's check boxes at employee list 762 in order to select the employee's whose training requirements will be modified. The coordinator may then add or remove the course from the training requirements of the selected employees using add button 758 or delete button 760. In an exemplary embodiment of the present invention, a screen or pop-up window will appear indicating that a given course has been added or removed from the selected employee's training requirements. FIG. 7F also illustrates current required course list 764.

Figure 7G:
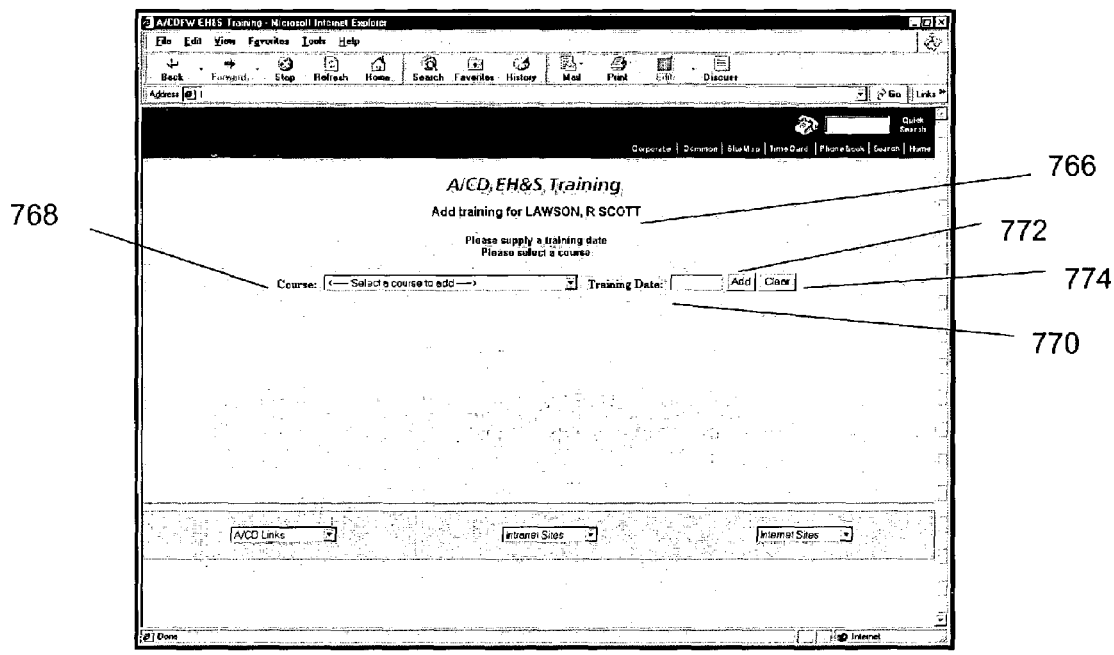
FIG. 7G is an employee specific screen for adding training for use with a training system in accordance with an exemplary embodiment of the present invention.

FIG. 7G is an exemplary screen that allows a training coordinator to input data related to a course that the employee completed, but that did not transfer to the training database, or if the training coordinator prefers to manually input the data using this method. The screen includes employee identifier 766, course selection box 768, and training date box 770. Add button 772 allows a coordinator to input the training into the system, and clear button 774 allows the coordinator to clear the entered text.

Figure 7H:
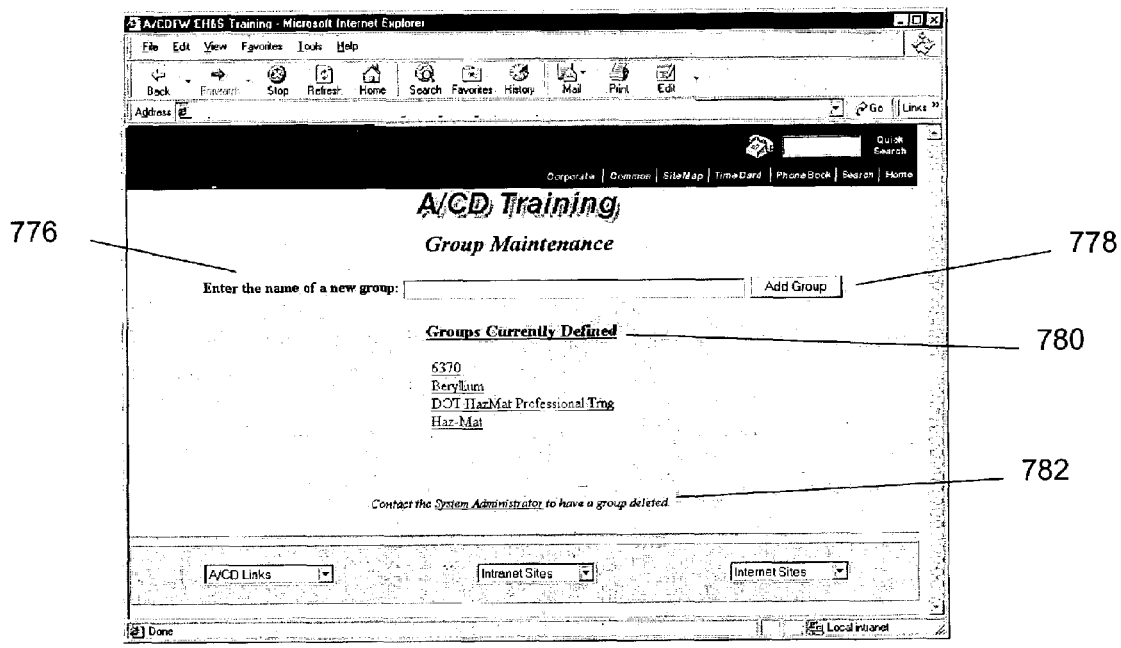
FIG. 7H is a training group maintenance screen for use with a training system in accordance with an exemplary embodiment of the present invention.
Figure 7I:
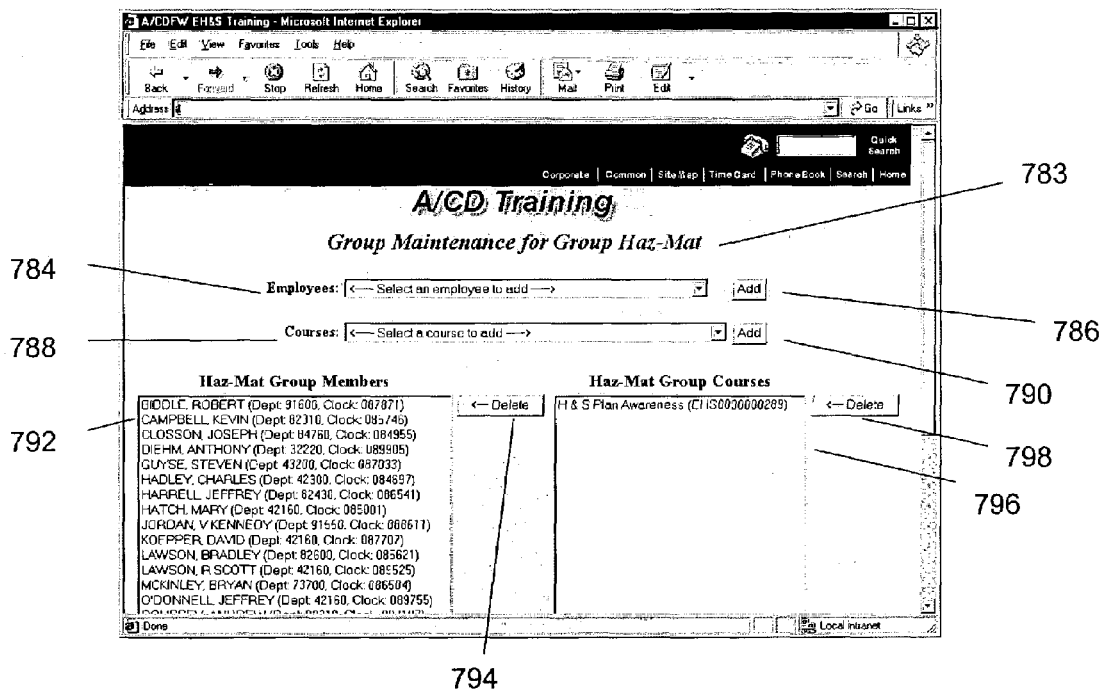
FIG. 7I is another training group maintenance screen for use with a training system in accordance with an exemplary embodiment of the present invention.

FIG. 7H is an initial screen for modifying training group requirements. This screen includes group name box 776, and add group button 778. This screen also includes list 780 that lists each of the training groups currently defined. This screen also includes link 782 for contacting the training system administrator. After entering the name of a new group in box 776, another screen useful for entering additional information about that group is brought up. FIG. 7I is an example of such a screen, and includes group identifier 783. In order to add employees to the group, the coordinator may select an employee using drop down 784, and add button 786. In order to add a course requirement for the group, the coordinator may select a course, using drop down 788 and add button 790. The coordinator may delete group members by selecting a member from list 792 and clicking delete button 794. The coordinator may delete a course from the training group by selecting a course from list 796 and clicking delete button 798.

Figure 8A:
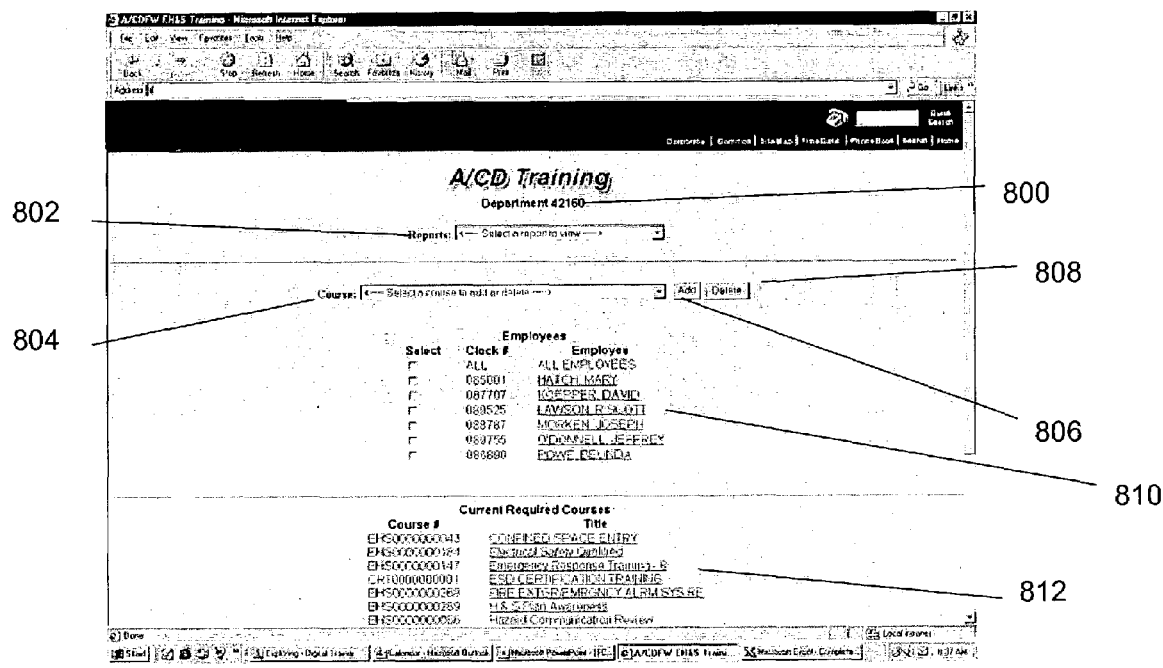
FIG. 8A is a department report screen for use with a training system in accordance with an exemplary embodiment of the present invention.
Figure 8B:
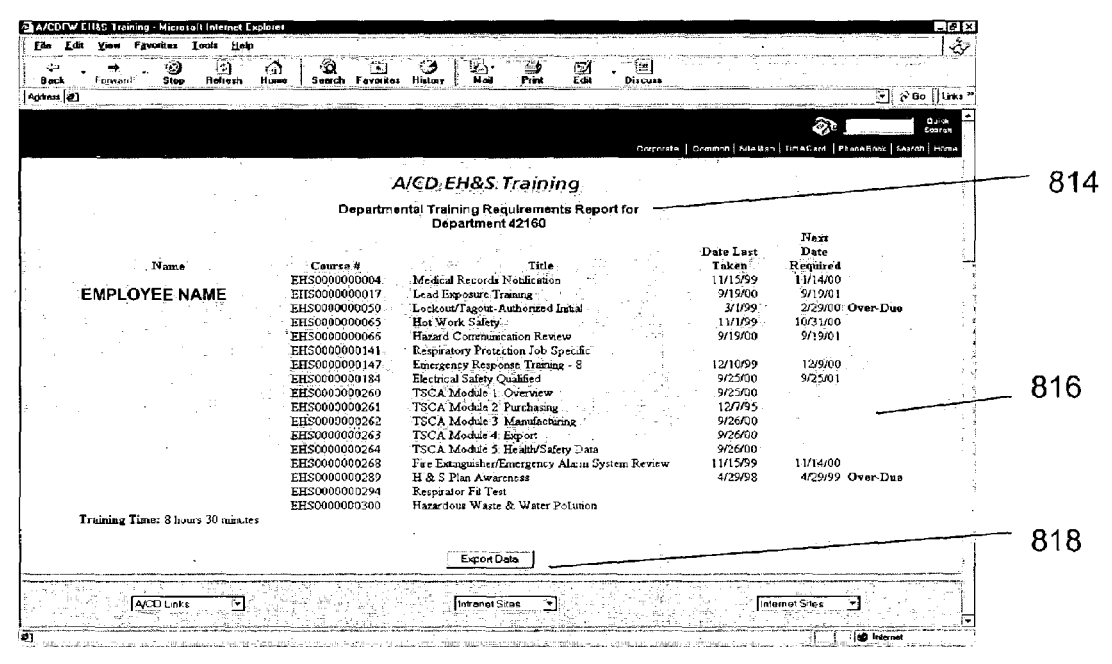

FIG. 8A is similar to FIG. 7D; however, FIG. 8A will be used to explain a method of producing a training report for a given department. FIG. 8A identifies the department with identifier 800. The coordinator may view any department-based reports using drop down box 802. Similar to FIG. 7D, the screen illustrated in FIG. 8A may be used to add or delete a course by selecting the course using course selection box 804, add button 806, delete button 808, and by selecting either all employees or individual employees using employee list 810. The screen illustrated in FIG. 8A also includes current required course list 812. In order to produce a department based training report, the coordinator may select a report from drop down box 802. By selecting a report using drop down box 802, an appropriate report screen will appear, for example, the screen shown in FIG. 8B. FIG. 8B includes identifier 814, training requirement list 816 and export data button 818. List 816 includes all courses that have been assigned to the employees in the selected department organized by course number, course title, date last taken, next date required, and an overdue notice if the next date required has been exceeded. Export data button 818 allows the training information to be exported to an external file, for example, a .csv (comma separated variable) file. Such a file may be opened, for example, in a spreadsheet program and if desired, this information may also be imported in a database.

Figure 8C:
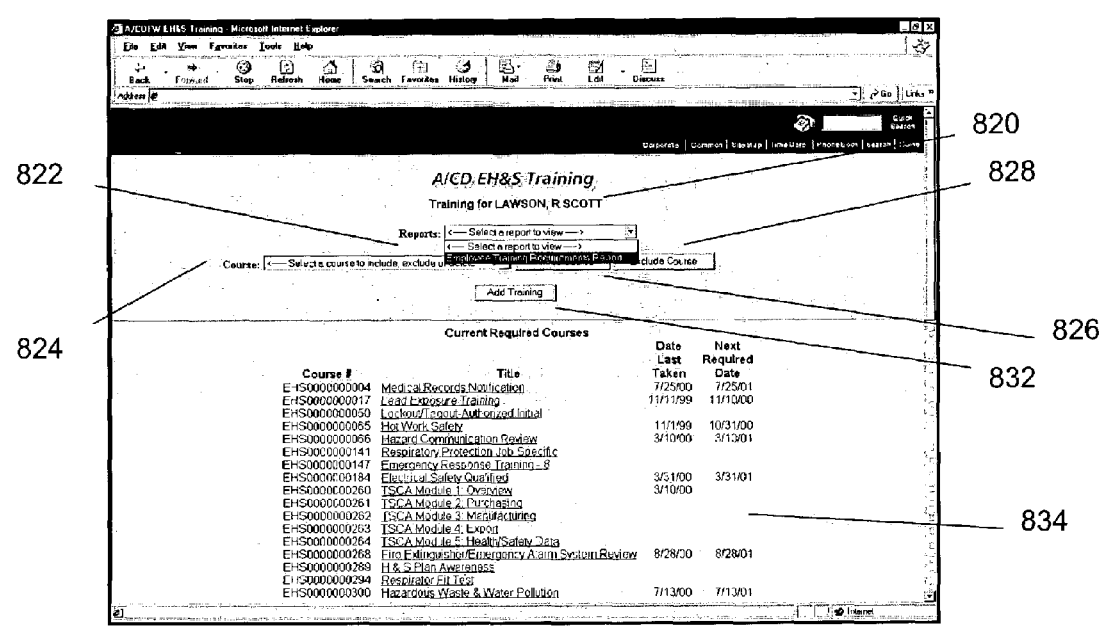

Similar to FIG. 7E, FIG. 8C is an employee specific training screen. This screen includes employee identifier 820, and report selection box 822. As described above with reference to FIG. 7E, in order to modify the training requirements of the employee, the coordinator may select a course from course selection box 824, and then either add or delete the course from the employee's training requirements by clicking include course button 826 or exclude course button 828. The coordinator can input training completed by the employee, but that did not transfer to the training system, using add training button 832. This screen also includes current required course list 834. In order to produce an employee specific report, the coordinator may select a report from report selection box 822, thereby bringing up an employee specific report such as the one illustrated in FIG. 8D.

Figure 8D:
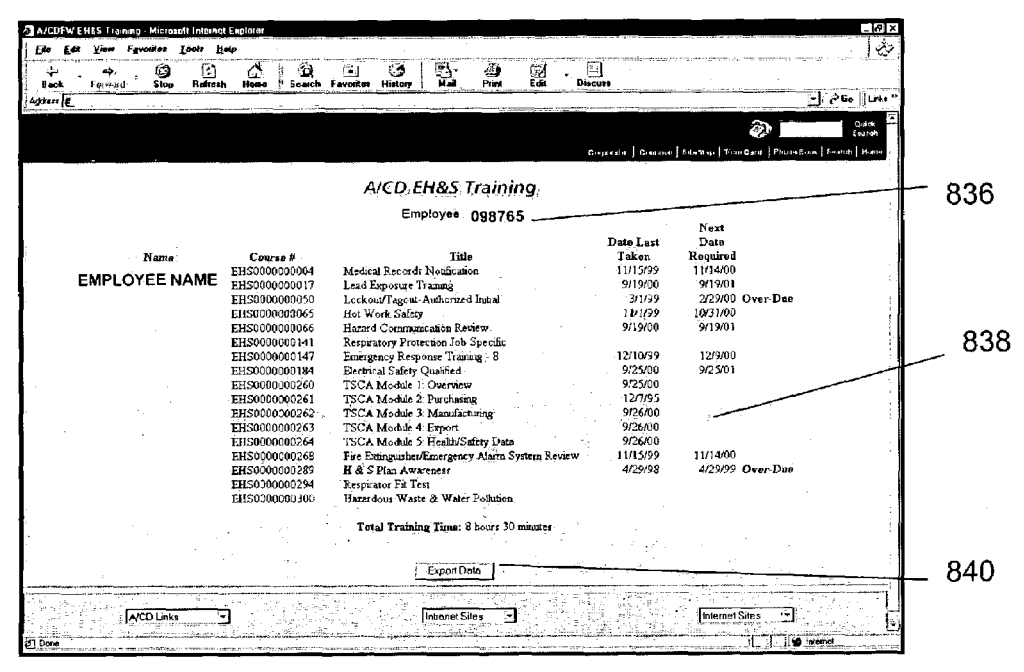

FIG. 8D includes employee identifier 836, employee course list 838, and export data button 840. Employee course list 838 includes all courses that have been assigned to the specific employee organized by course number, title of course, date last taken, next date required, and an overdue notice if the next date required has been exceeded. Export data button 840 allows the coordinator to export the training information to an external file, for example, a .csv file, which may be opened into a spreadsheet program. Further, the training information may also be imported into a database.

Figure 9A:
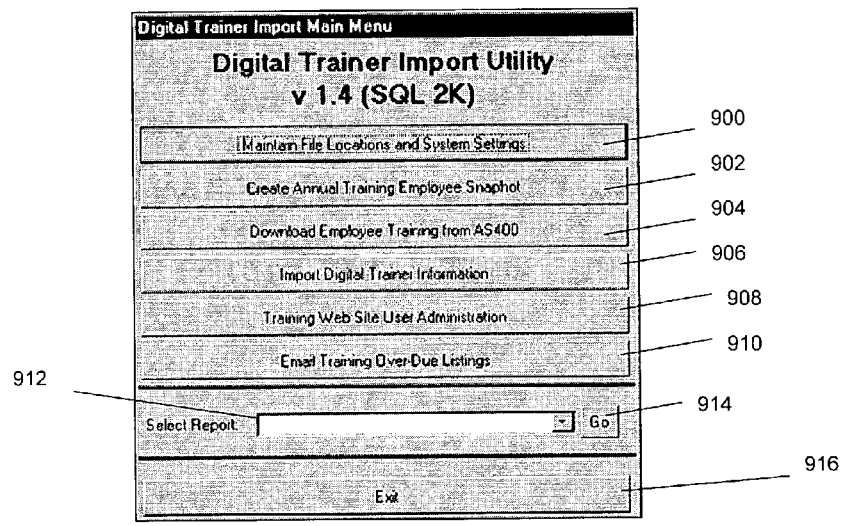
FIG. 9A is a training menu screen for use with a training system in accordance with an exemplary embodiment of the present invention.
Figure 9B:
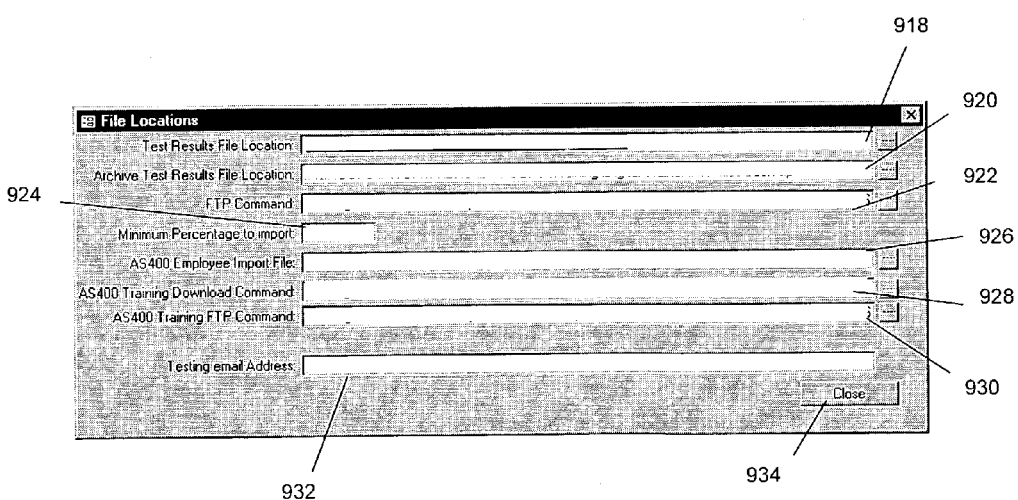
FIG. 9B is a file location and system settings screen for use with a training system in accordance with an exemplary embodiment of the present invention.

In an exemplary embodiment of the present invention, the training program includes a digital trainer import utility. The digital trainer import utility is provided for a number of reasons, including: administrating and importing on-line records, importing AS/400 training records, providing access and privileges to the training program, managing training coordinator's departmental assignments, running reports, and providing training metrics for reporting. FIG. 9A illustrates an exemplary main menu for digital trainer import utility. The digital trainer import utility main menu includes numerous program shortcut launches such as Maintain File Locations and Systems Settings button 900, Create Annual Training Employee Snapshot button 902, Download Employee Training from AS/400 button 904, Import Digital Trainer Information button 906, Training Website User Administration button 908, and Email Training Overdue Listings button 910. The digital trainer import utility main menu also includes a select report drop down 912 (and an associated "go" button 914) and an exit button 916.

Upon clicking Maintain File Locations and Systems Settings button 900, a screen such as the one shown in 9B appears. This screen stores various pieces of information related to a training file location and the training system settings. Block 918 stores the test results file location, where the text file may be a .txt file. Block 920 stores the archive test results file location. In an exemplary embodiment of the present invention, block 920 is the location where the FTP program copies on-line text files for back-up records in a raw data format. Block 922 is a location on the user's computer where the FTP program is located. Block 924 holds the value of the minimum score required for passing an on-line training program, for example, 90%.

Block 926 is the location of the employee information that is generated daily by the information systems department. Block 928 is the system setting for launching the AS/400 training download utility. Block 930 is the location of the script that runs the AS/400 download. Block 932 is an address that may be used to test e-mail features of the training program. Button 934 is used to close the Maintain File Locations and System Settings portion of the digital trainer import utility.

Upon clicking Create Annual Training Employee Snapshot button 902, a real time snapshot of employee personnel data is provided. This snapshot, in the form of a table, may be used to compare the employee snapshot toward completing a particular course or courses for annual tracking. This feature may be included in certain embodiments of the present invention.

Upon clicking Download Employee Training from AS/400 button 904, a download of all training records from the AS/400 begins. These training records are imported into the digital trainer utility for reporting and tracking in the training coordinator's administration web page. In an exemplary embodiment of the present invention, this download from the AS/400 is accomplished using a rally file transfer command. In order to complete this download, a log-in and password may first be required. The program then imports the training records, and a query runs and deletes the old AS/400 training records, thereby replacing them with the new, imported records.

Figure 9C:
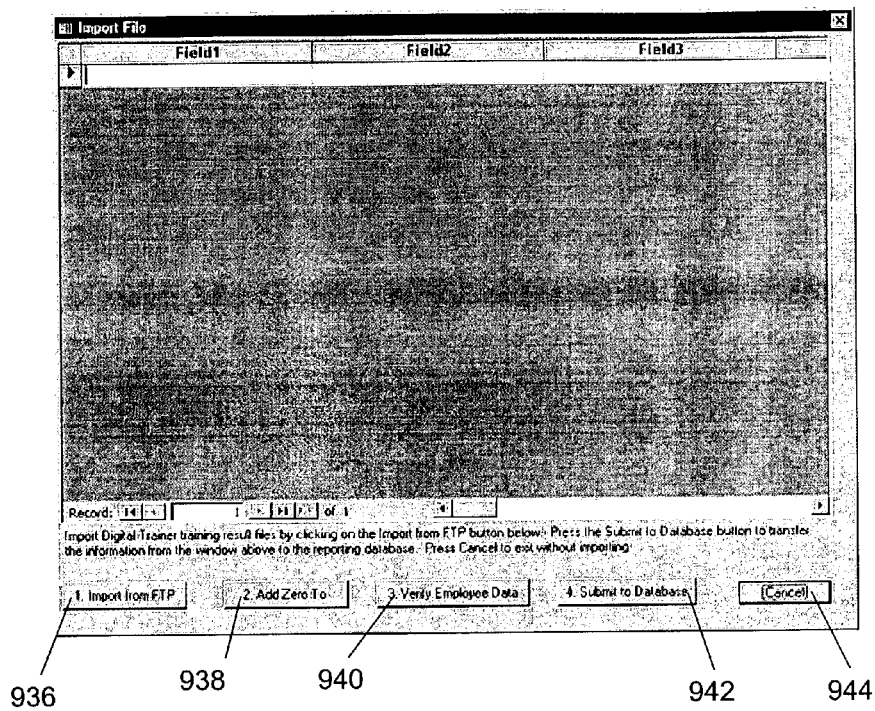
FIG. 9C is a training information importation screen for use with a training system in accordance with an exemplary embodiment of the present invention.

Upon clicking Import Digital Trainer Information button 906, a screen such as that shown in FIG. 9C appears. This screen provides Import from FTP button 936, Add Zero To button 938, Verify Employee Data button 940, Submit to Database button 942, and Cancel button 944. Upon launching Import from FTP button 936, the FTP program is started. This program imports all on-line training files transmitted to the FTP site, creates a backup of the file, deletes the imported file from the FTP site to eliminate duplicative import records, and imports the on-line training file into the table shown in FIG. 9C. Upon launching Add Zero To button 938, leading zeros are added to the clock number (not shown in FIG. 9C). For example, zeros may be added to the beginning of the clock number until it is six figures in length. Upon launching Verify Employee Data button 940, the clock number entered is checked against an employee master file to verify that the employee name and department have been entered correctly. Upon launching Submit to Database button 942, the training records are appended to the main table where all on-line training records are maintained. Cancel button 944 may be used to exit the screen shown in FIG. 9C.

Figure 9D:
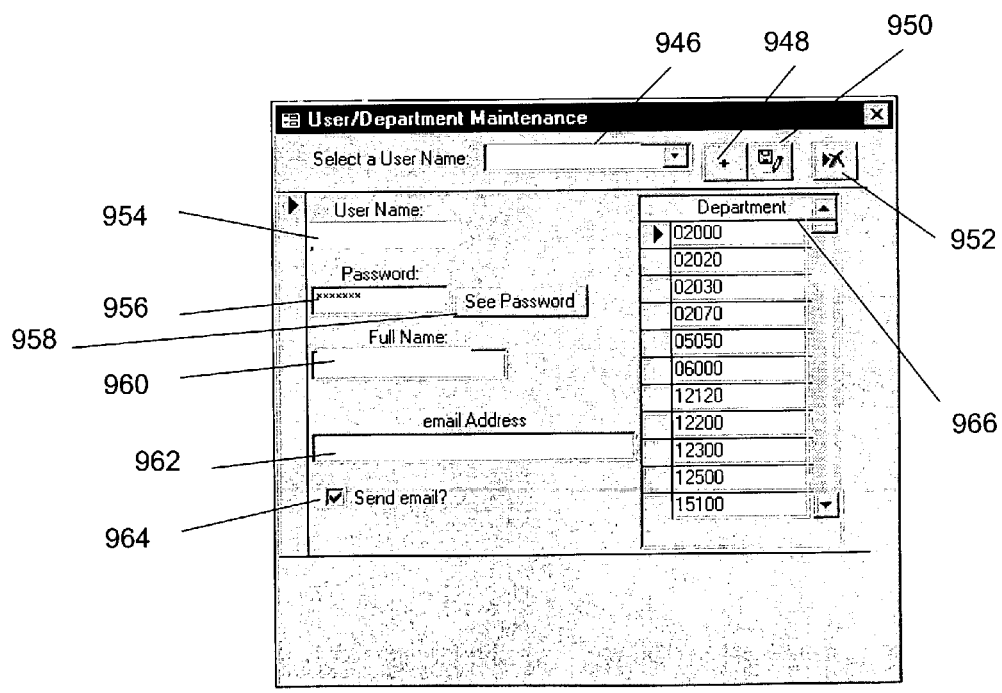
FIG. 9D is a training administration screen for use with a training system in accordance with an exemplary embodiment of the present invention.

Upon clicking Training Website User Administration button 908, a screen such as the one illustrated in FIG. 9D appears. This screen is used to administrate access to the training administration web page. Users can be added and deleted from access to the training administration web page using this screen. Further, departments can be added to the user's access. An existing user can be selected for viewing or editing by clicking the drop-down arrow at block 946 and selecting a user. In order to add a user, a user name is input into block 954, a user password is established at block 956, the user's full name is included in block 960, and the user's email address is included in block 962. To include this user in the e-mail notices block 964 is clicked so that it is checked. In order to see the password, button 958 can be depressed. The departments that the user will have access to are listed in department list 966. A new user can be added by depressing button 948. The information entered can be saved to the system by depressing save record button 950. A user can be deleted by depressing the delete record button 952.

Figure 9E:
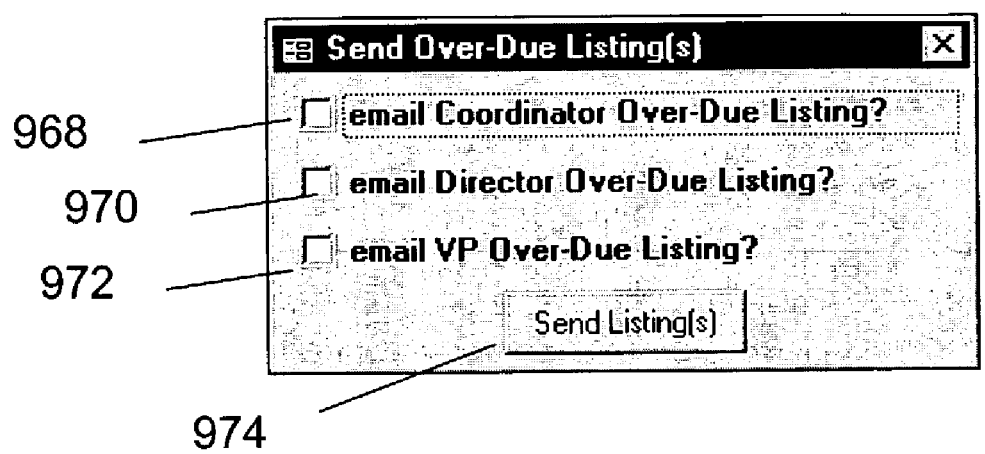
FIG. 9E is a training reminder screen for use with a training system in accordance with an exemplary embodiment of the present invention.

Upon clicking Email Training Overdue Listings button 910, a screen such as the one illustrated in FIG. 9E appears. This screen allows for overdue training notifications to be sent to various parties. By selecting block 968 (and clicking button 974), training coordinators will be e-mailed a complete listing of all overdue training records for employees listed in their department. By selecting block 970 (and clicking button 974), directors will receive an e-mail report of their department's training percent completion. By clicking block 972 (and clicking button 974), vice-presidents will receive an e-mail report of their department's training percent completion.

Figure 10A:
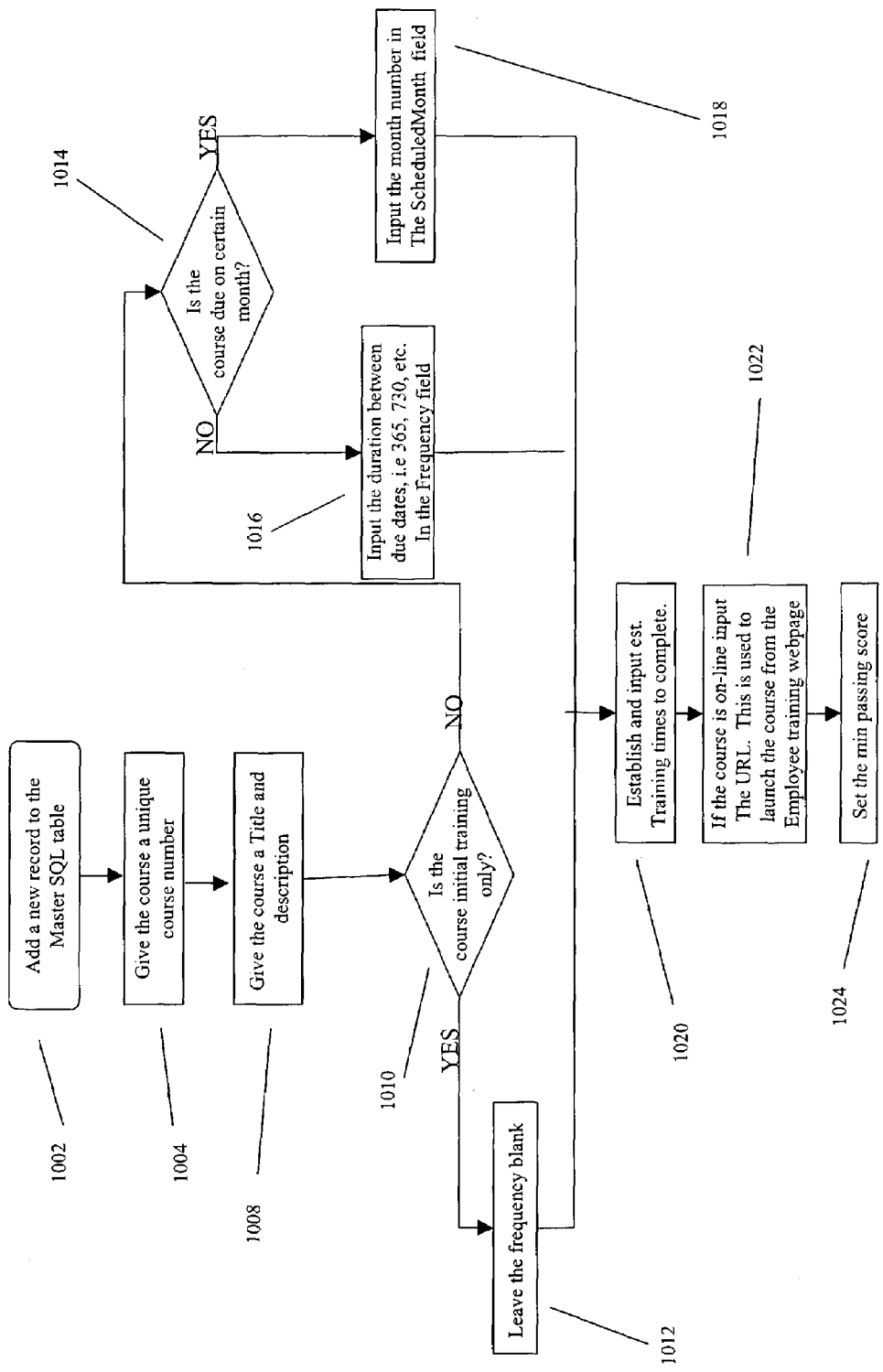
FIG. 10A is a flow diagram illustrating course creation and set-up for use with a training system in accordance with an exemplary embodiment of the present invention.
Figure 10B:
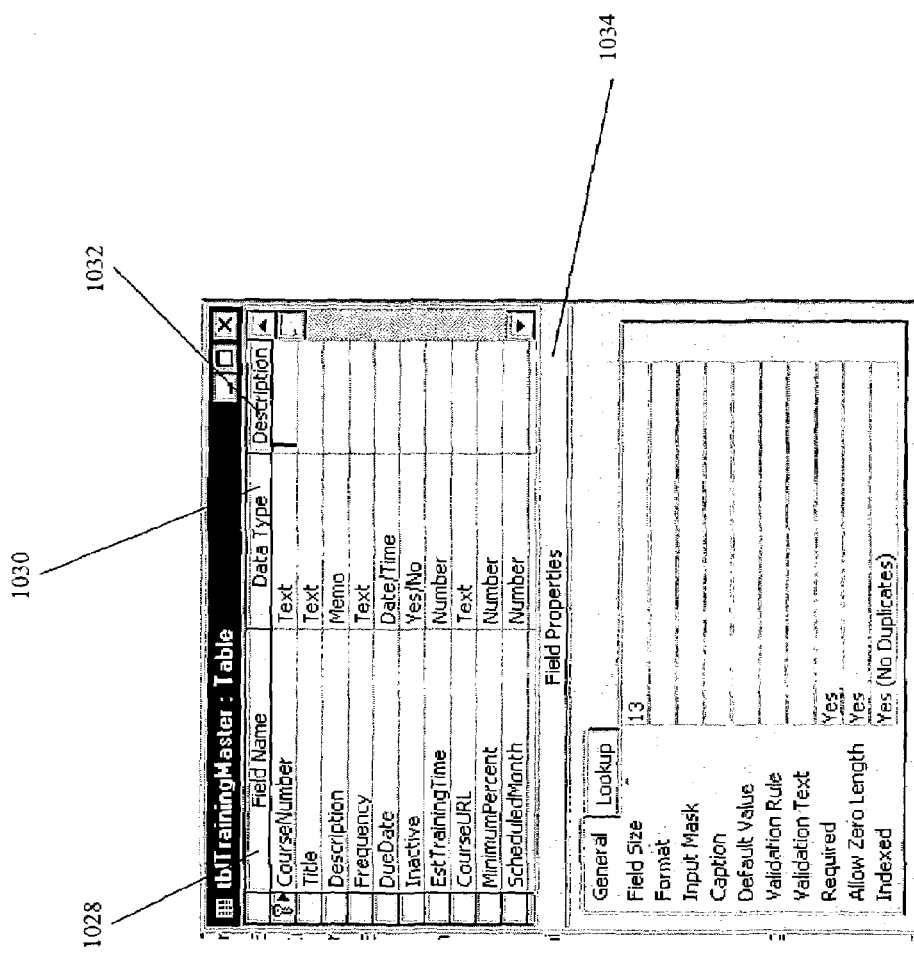
FIG. 10B is a course creation and set-up table for use with a training system in accordance with an exemplary embodiment of the present invention.

FIGS. 10A through 16B relate to activities performed by the administrator(s) of the master database. FIG. 10A is a flow chart illustrating a process for creating and setting up courses to be assigned to an employee's curriculum. At step 1002, a new record is added to the master table (e.g., an SQL table). An exemplary new record is illustrated in FIG. 10B, and is organized according to field name column 1028, data type 1030, description column 1032, and field properties section 1034. Referring again to FIG. 10A, a unique course number is given to the course at step 1004 (as with each of the various features described in relation to FIG. 10A, the unique course number is also tabulated in FIG. 10B). At step 1008, a course title and description are given. At decision step 1010, a determination is made as to whether the course is initial training only. If the course is initial training only, the frequency block in the table illustrated in FIG. 10B is left blank. If the course is not initial training only, a determination is made at decision step 1014 as to whether the course is due during a certain month of the year. If the course is due during a certain month of the year, the appropriate month number is entered into a scheduled month field at step 1018. If the course is not due during a certain month, a duration between due dates (e.g., 365 days) is input in the frequency field at step 1016. At step 1020, estimated times to complete the training are input. At step 1022, a URL is input if the course is an on-line course. This URL may be used to launch the course from an employee training web page. At step 1024, a minimum passing score is set.

Figure 11:
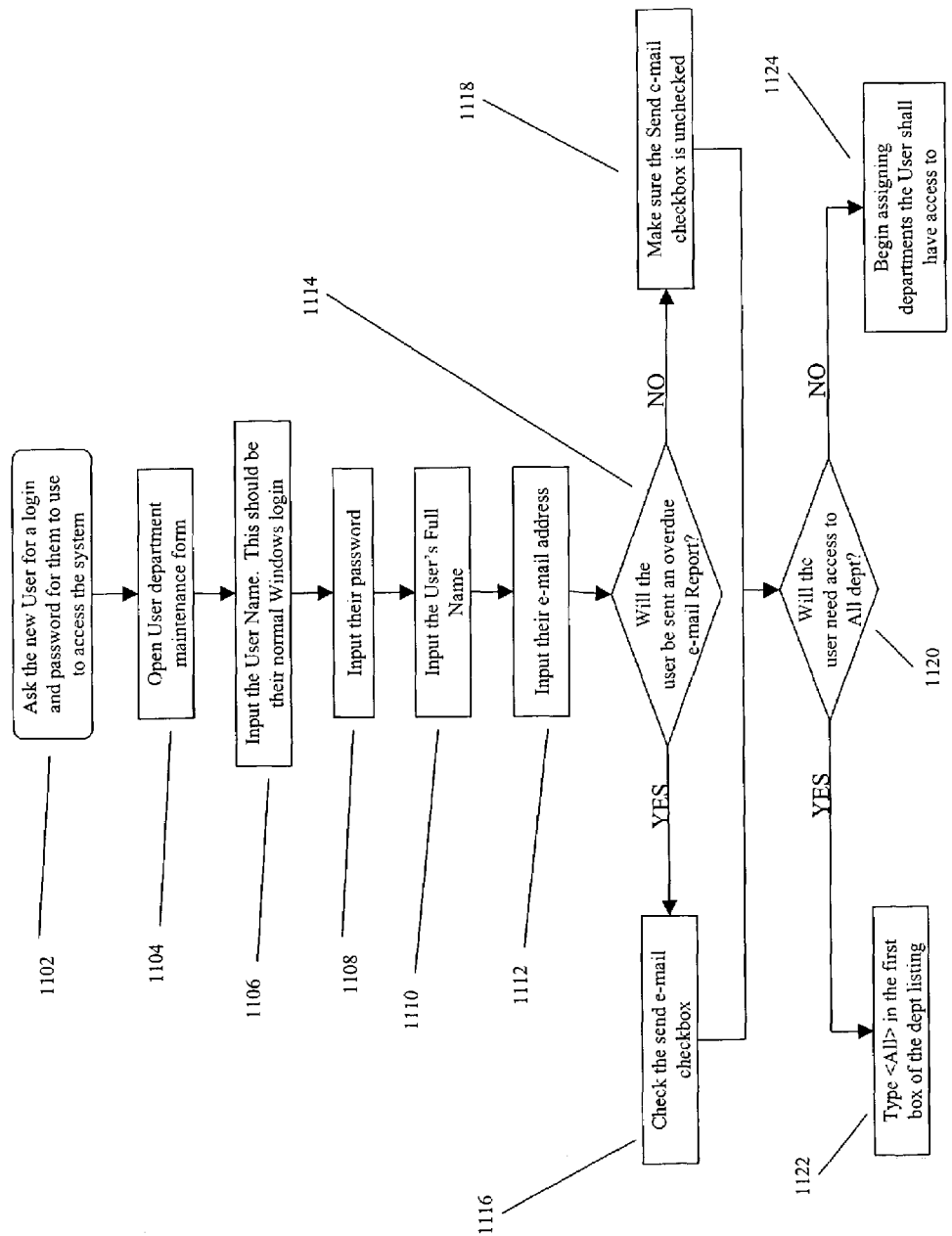
FIG. 11 is a flow diagram illustrating the creation of user access to a training system in accordance with an exemplary embodiment of the present invention.

FIG. 11 is a flow diagram illustrating an exemplary process for creating training coordinators and establishing their associated access privileges to the training system. At step 1102, the new user provides a login and password to be used to access the training system. At step 1104, a user department maintenance form is opened. An example of such a form has been previously illustrated and described by reference to FIG. 9D, and will be further described now. At step 1106, the user name is input (see block 954 in FIG. 9D). For example, the user name may be the user's normal operating system login. At step 1108, the user's password is input into the maintenance form (see block 956 in FIG. 9D). At step 1110, the user's full name is input into the maintenance form (see block 960 in FIG. 9D). At step 1112, the user's email address is input into the maintenance form (see block 962 in FIG. 9D). At decision step 1114, a determination is made as to whether the user will be sent an overdue email report. If the user will be sent an overdue email report, the send email check box is checked at step 1116 (see check block 964 in FIG. 9D). If the user will not be sent an overdue email report, a verification that the send email check box is not checked is performed at step 1118. At decision step 1120, a determination is made as to whether the user will need access to training data for all departments. If the user will need access to the training data for all departments, "<All>" will be entered into the first box in the department listing at step 1122 (see department listing 966 in FIG. 9D). If the user will not need access to the training data for all departments, the appropriate departments are assigned in the department listing at step 1124.

Figure 12:
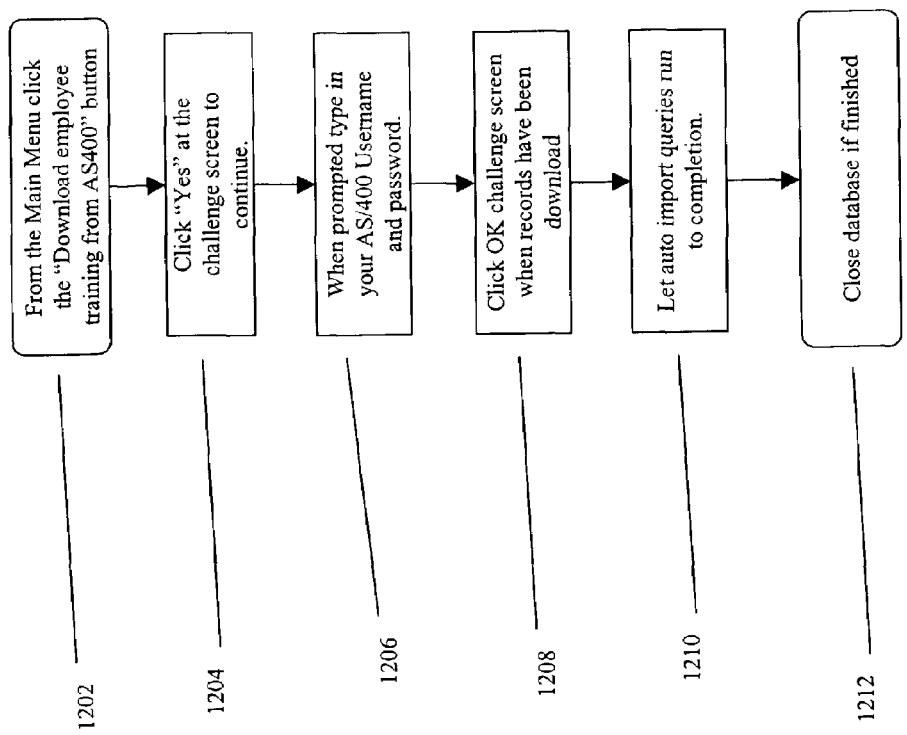
FIG. 12 is a flow diagram illustrating the retrieval of employee training data in accordance with an exemplary embodiment of the present invention.

FIG. 12 is a flow diagram illustrating an exemplary method of downloading employee training information from a previously existing training system such as the AS/400 system. At step 1202, the download employee training button is depressed from a main menu. At step 1204, the "yes" button is depressed to continue. At step 1206, the AS/400 user name and password are entered at the prompts. At step 1208, the "ok" button is depressed when all records have been downloaded. At step 1210, auto import queries are run. At step 1212, the database is closed.

Figure 13:
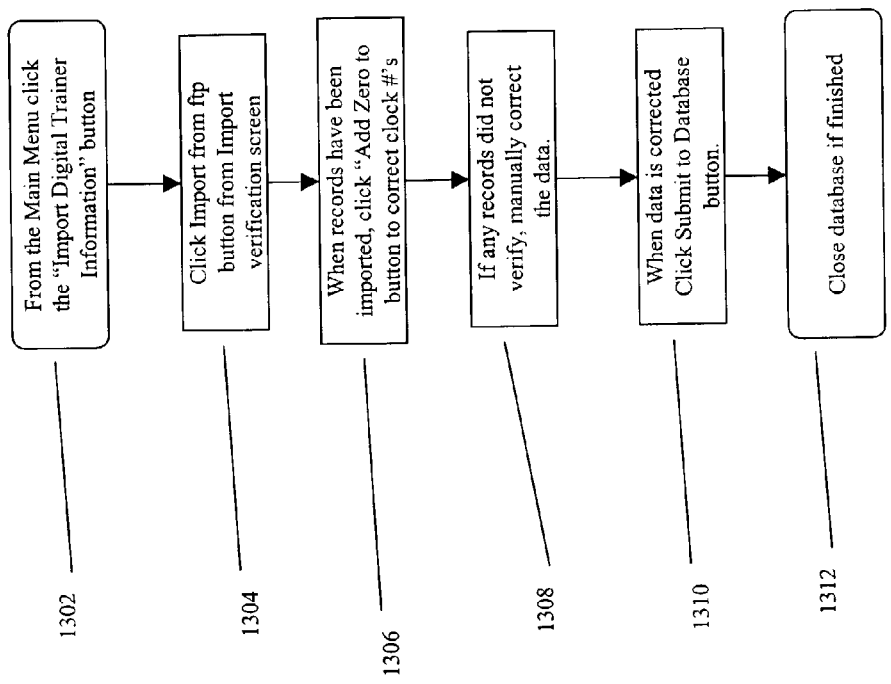
FIG. 13 is a flow diagram illustrating the retrieval of training text files in accordance with an exemplary embodiment of the present invention.

FIG. 13 is a flow diagram illustrating a process for downloading and importing training text files from an FTP site. This process will be explained by reference to FIG. 9C, as well as FIG. 13. At step 1302, the import digital trainer information button is depressed at the main menu. At step 1304, the import from FTP button is depressed from the import verification screen (see button 936 at FIG. 9C). At step 1306, after the appropriate records have been imported, the "Add Zero To" button is depressed to format the employee clock numbers (see button 938 at FIG. 9C). At step 1308, if any of the training records did not verify, the training data is manually corrected (see button 940 at FIG. 9C). At step 1310, the submit to database is depressed after the data is corrected (see button 942 at FIG. 9C). At step 1312, the database is closed.

Figure 14:
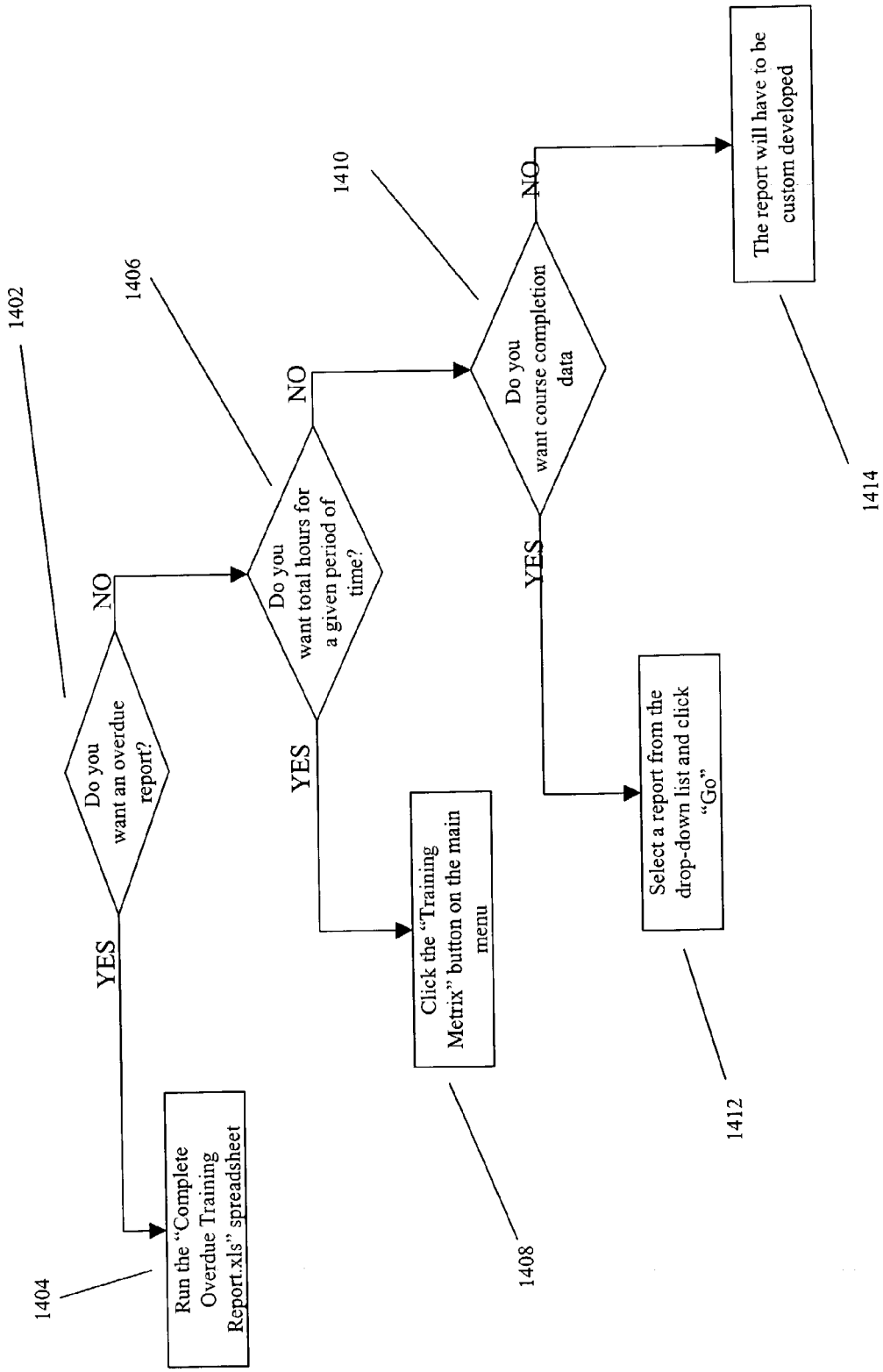
FIG. 14 is a flow diagram illustrating a reporting process for use with a training system in accordance with an exemplary embodiment of the present invention.

FIG. 14 is a flow diagram illustrating a process for running reports from the training system related to training status and metrics. At decision step 1402, a determination is made as to whether an overdue report is desired. If an overdue report is desired, the complete overdue training report spreadsheet is run at step 1404. If an overdue report is not desired, a determination is made at decision step 1406 as to whether the total hours for a given period of time are desired. If the total hours are desired, the training metrix button is depressed at the main menu at step 1408. If the total hours are not desired, a determination is made at decision step 1410 as to whether course completion data is desired. If course completion data is desired, a report is selected from the report drop down list, and the "go" button is depressed, at step 1412. If course completion data is not required, the report is custom developed at step 1414.

Figure 15:
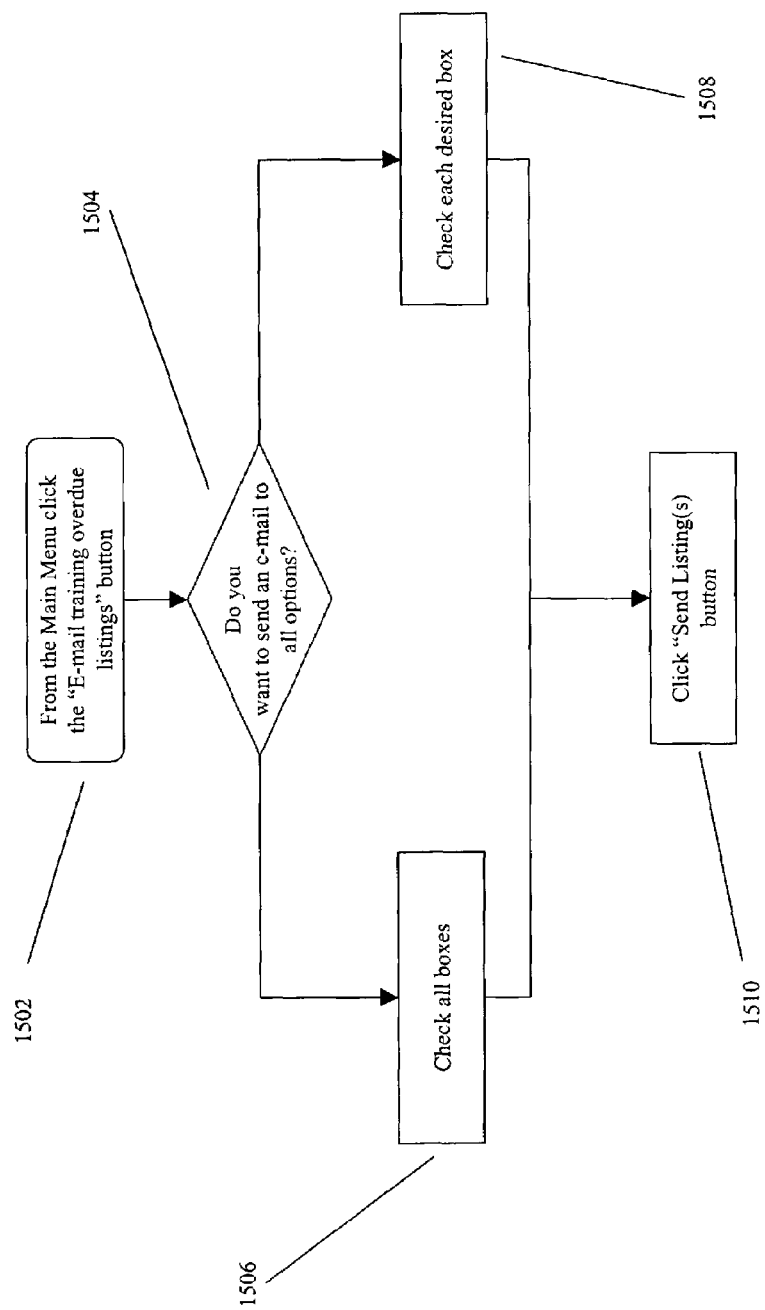
FIG. 15 is a flow diagram illustrating a notification process for use with a training system in accordance with an exemplary embodiment of the present invention.

FIG. 15 is a flow diagram illustrating a process for e-mailing overdue reports to training coordinators, vice-presidents, and directors. This process will be explained by reference to FIG. 9E as well as FIG. 15. At step 1502, the e-mail training overdue listings button is depressed at the main menu. At decision step 1504, a determination is made as to whether all of the overdue e-mail options are desired, or as to whether only selected overdue e-mail options are desired. If all overdue e-mail options are desired, each of the boxes are checked at step 1506 (see check boxes 968, 970, and 972 at FIG. 9E). If selected overdue e-mail options are desired, the appropriate selections are checked at 1508 (see check boxes 968, 970, and 972). At step 1510, the send listings button is depressed in order to send the overdue e-mail reports (see button 974 at FIG. 9E).

Figure 16A:
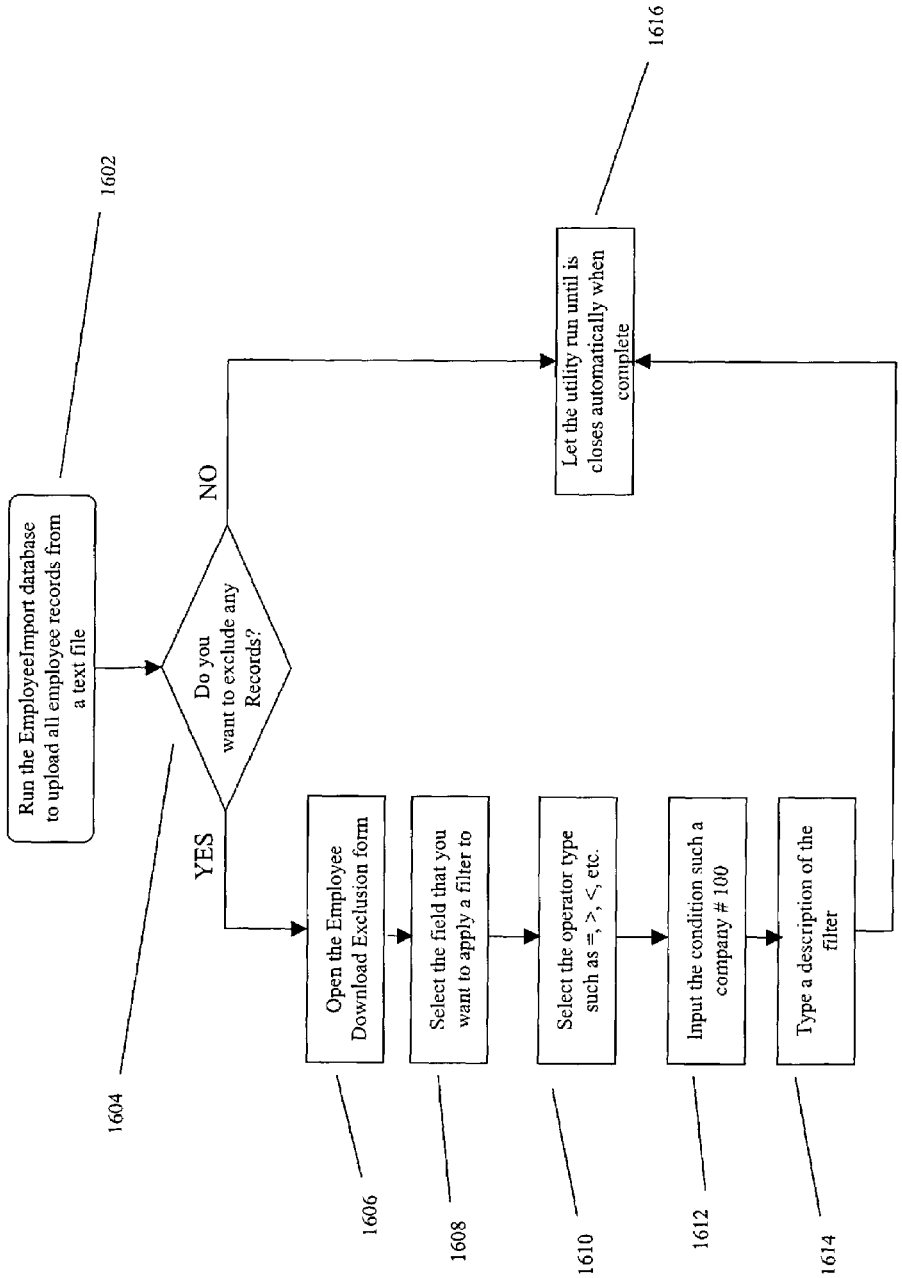
FIG. 16A is a flow diagram illustrating retrieval of employee personnel data for use with a training system in accordance with an exemplary embodiment of the present invention.
Figure 16B:
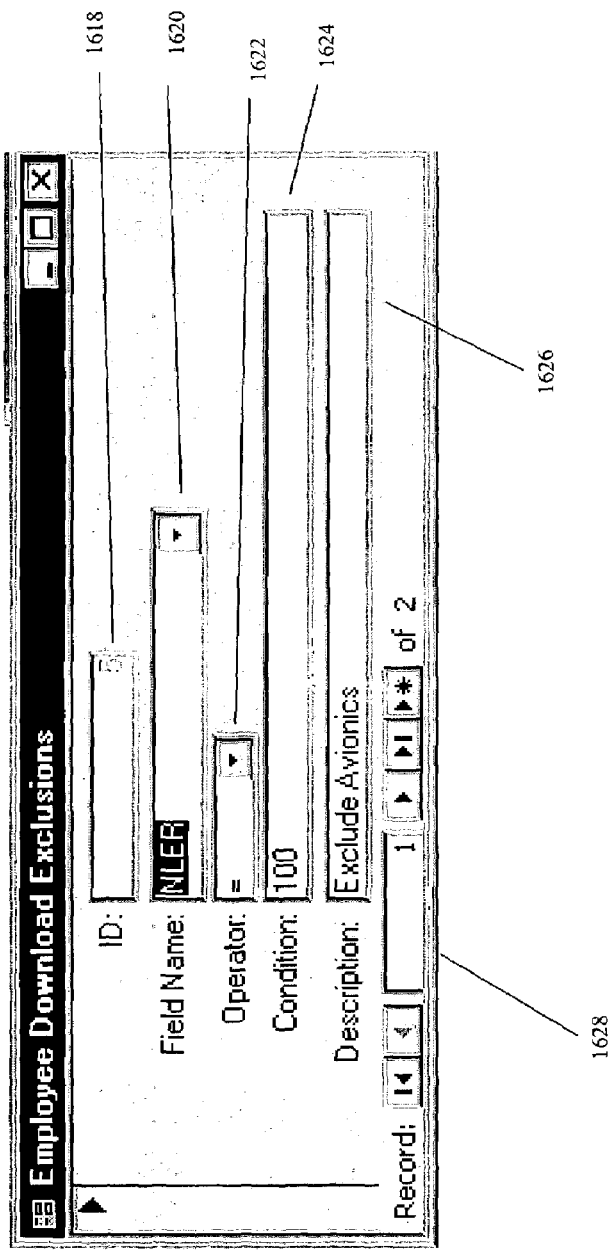
FIG. 16B is an employee record exclusion screen for use with a training system in accordance with an exemplary embodiment of the present invention.

FIG. 16A is a flow diagram illustrating a process of importing an employee's personnel data into the master database. At step 1602, the employee import database is run to upload all employee records from a text file. At decision step 1604, a determination is made as to whether any records are to be excluded. If no records are to be excluded, the utility runs until it is complete and then closes at step 1616. If certain records are to be excluded, open the employee download exclusion form at step 1606. An exemplary download exclusion form is illustrated in FIG. 16B. An id number is automatically entered into ID block 1618 of the employee download exclusion form illustrated in FIG. 16B. Again referring to FIG. 16A, at step 1608, the field to be filtered is selected (see field name box 1620 at FIG. 16B). At step 1610, an operator type (e.g., =, >, <, etc.) is selected (see operator box 1622 at FIG. 16B). At step 1612, a condition number or text string, such as a company number or job title, is input (see condition box 1624 at FIG. 16B). At step 1614, a description is typed into the filter (see description box 1626 at FIG. 16B). This process is repeated for each type or group of employee records to be excluded. Record number box 1628 in FIG. 16B illustrates which filter is being edited. Record box 1628 in FIG. 16B illustrates that filter one is the first of two filters to employee records. Each filter may be used to exclude records related to an individual employee, a group, a department, or even the entire company. After all appropriate employee download exclusions are completed, the employee download exclusion form is closed, and the utility is run at step 1616.

Although the present invention has been described primarily in terms of training related to employees of an organization, it is not limited thereto. The invention applies to the training of any type of individual or group.

Although the previously existing training database has primarily been described in relation to an AS/400 database system, the previously existing training database is not limited thereto. Various types of training databases may be used as the previously existing training database so long as a master database can retrieve the contents of the previously existing training database.

Although illustrated and described herein with reference to certain specific embodiments, the present invention is nevertheless not intended to be limited to the detailed shown. Rather, various modifications may be made in the details within the scope and arranges of equivalence of the claims and without departing from the spirit of the invention.

What is claimed:

1. A method of processing training data, the method comprising the steps of:

accessing training data stored in at least one of a plurality of training databases, the training data being related to at least one of a plurality of employees;

providing an on-line training course for use by at least one of the plurality of employees, the on-line training course being distinct from the plurality of training databases;

formatting the training data included in the at least one of the plurality of databases such that the training data can be processed by a master database;

importing the formatted training data into the master database; and updating the master database to include training information related to the on-line training course upon the successful completion of the on-line training course by one of the plurality of employees.

2. The method of claim 1 additionally comprising the step of:

manually entering training data into the master database.

3. The method of claim 1 wherein the step of providing an on-line training course includes providing a link on an employee specific webpage to the on-line training course.

4. The method of claim 1 wherein the step of formatting the training data includes formatting the training data to be in a comma delimited text file format.

5. The method of claim 1 additionally comprising the step of:

transmitting the training information to a file transfer protocol site, the training information being related to the completed on-line training course.

6. The method of claim 5 wherein the step of updating the master database includes extracting the training information from the file transfer protocol site.

7. The method of claim 1 additionally comprising the step of:

providing an employee specific webpage indicating training requirements for an employee, the employee specific webpage including a hyperlink to the on-line training course.

8. The method of claim 1 additionally comprising the step of:

reviewing the contents of the master database on a predetermined interval to determine if a training course assigned to one of the employees has been completed.

9. The method of claim 8 additionally comprising the step of:

notifying the one of the employees, via an e-mail message, upon determining that the training course has not been completed by a predetermined date.

10. A computer readable medium including computer program instructions which cause a computer to implement a method of processing training data comprising the steps of:

accessing training data stored in a plurality of training databases, the training data being related to at least one of a plurality of employees;

providing an on-line training course for use by at least one of the plurality of employees, the on-line training course being distinct from the plurality of training databases;

formatting the training data included in at least one of the plurality of databases such that the training data can be processed by a master database;

importing the formatted training data into the master database; and updating the master database to include training information related to the on-line training course upon the successful completion of the on-line training course by one of the plurality of employees.

* * * * *